(12) United States Patent
Grycz

(10) Patent No.: US 12,557,180 B2
(45) Date of Patent: Feb. 17, 2026

(54) SYSTEMS AND METHODS FOR EMERGENCY VEHICLE TELECOMMUNICATIONS

(71) Applicant: Mercedes-Benz Group AG, Stuttgart (DE)

(72) Inventor: Thomas Grycz, Ponte Vedra, FL (US)

(73) Assignee: MERCEDES-BENZ GROUP AG, Stuttgart (DE)

( * ) Notice: Subject to any disclaimer, the term of this patent is extended or adjusted under 35 U.S.C. 154(b) by 341 days.

(21) Appl. No.: 18/320,660

(22) Filed: May 19, 2023

(65) Prior Publication Data

US 2024/0389194 A1  Nov. 21, 2024

(51) Int. Cl.
*H04W 76/50* (2018.01)
*H04W 4/90* (2018.01)
*H04W 76/18* (2018.01)

(52) U.S. Cl.
CPC ............. *H04W 76/50* (2018.02); *H04W 4/90* (2018.02); *H04W 76/18* (2018.02)

(58) Field of Classification Search
CPC ........ H04W 76/50; H04W 76/18; H04W 4/90
USPC ....................................................... 455/404.1
See application file for complete search history.

(56) References Cited

U.S. PATENT DOCUMENTS

| | | | |
|---|---|---|---|
| 6,340,928 B1 | 1/2002 | McCurdy | |
| 8,929,853 B2 | 1/2015 | Butler | |
| 9,432,828 B1 * | 8/2016 | Tu | H04M 1/72421 |
| 9,672,719 B1 * | 6/2017 | Hollenstain | G08B 21/18 |
| 10,873,844 B2 | 12/2020 | Hans | |
| 11,412,080 B2 | 8/2022 | Borras et al. | |
| 12,167,312 B2 * | 12/2024 | Kwon | H04W 4/40 |
| 2015/0365979 A1 | 12/2015 | Park | |
| 2017/0086045 A1 | 3/2017 | Lucero et al. | |
| 2017/0135136 A1 * | 5/2017 | Lei | H04M 1/72454 |
| 2017/0171734 A1 * | 6/2017 | Lee | H04L 67/12 |
| 2018/0367943 A1 | 12/2018 | Pipes | |
| 2019/0053154 A1 * | 2/2019 | Song | H04W 4/90 |

(Continued)

FOREIGN PATENT DOCUMENTS

WO    WO 2022/098475 A2    5/2022

OTHER PUBLICATIONS

Apple, "Use Crash Detection on iPhone or Apple Watch to call for help in an accident", Nov. 15, 2022, https://support.apple.com/en-us/HT213225, retrieved on Mar. 7, 2023, 3 pages.

*Primary Examiner* — Maria El-Zoobi
(74) *Attorney, Agent, or Firm* — Dority & Manning, P.A.

(57) ABSTRACT

Methods, computing systems, and technology for emergency vehicle telecommunications are presented. For example, a computing system may be configured to obtain incident data, via one or more sensors, descriptive of an incident event involving the vehicle. The computing system may be configured to determine, based on the incident data, that an emergency provider is to be contacted. The computing system may be configured to determine that the vehicle is unable to connect with the emergency provider using a communication unit of the vehicle. The computing system may be configured to output, to a mobile user device paired to the vehicle through a short-range wireless protocol, a signal indicating that the mobile user device is to initiate a call to the emergency provider.

18 Claims, 10 Drawing Sheets

(56) References Cited

U.S. PATENT DOCUMENTS

| | | | |
|---|---|---|---|
| 2020/0029194 A1* | 1/2020 | Speaker | H04W 4/027 |
| 2020/0098200 A1* | 3/2020 | Pohlenz | G08G 1/205 |
| 2020/0314621 A1* | 10/2020 | Cohen | H04W 76/50 |
| 2022/0030408 A1* | 1/2022 | Zhang | H04W 4/90 |

* cited by examiner

SYSTEMS AND METHODS FOR EMERGENCY VEHICLE TELECOMMUNICATIONS

FIELD

The present disclosure relates generally to improving the telecommunications ability of a vehicle. More particularly, the present disclosure relates to extending the ability of a vehicle to contact a third-party by leveraging the communications resources of a distributed computing ecosystem.

BACKGROUND

A vehicle may experience a collision or other occurrence while traveling from one location to another. The vehicle may include functionality for a passenger of the vehicle to call an emergency responder using the vehicle's onboard communication unit.

SUMMARY

Aspects and advantages of implementations of the present disclosure will be set forth in part in the following description, or may be learned from the description, or may be learned through practice of the implementations.

One example aspect of the present disclosure is directed to a computing system of a vehicle. The computing system includes a control circuit configured to obtain incident data, via one or more sensors, descriptive of an incident event involving the vehicle. The control circuit is configured to determine, based on the incident data, that an emergency provider is to be contacted. The control circuit is configured to determine that the vehicle is unable to connect with the emergency provider using a communication unit of the vehicle. The control circuit is configured to output, to a mobile user device paired to the vehicle through a short-range wireless protocol, a signal indicating that the mobile user device is to initiate a call to the emergency provider.

In an embodiment, to determine that the vehicle is unable to connect with the emergency provider using the communication unit of the vehicle, the control circuit is configured to determine that the vehicle has made a plurality of attempts to connect with the emergency provider using the communication unit, wherein each attempt failed to establish a communications connection with a system associated with the emergency provider; determine that the plurality of attempts is equal to, or exceeds, a threshold number of attempts; and in response to the plurality of attempts being equal to, or exceeding, the threshold number of attempts, determine that the vehicle is unable to connect with the emergency provider using the communication unit of the vehicle.

In an embodiment, an audio output device of the vehicle is utilized for an audio output portion of the call between the mobile user device and the emergency provider.

In an embodiment, an audio input device of the vehicle is utilized for an audible input portion of the call between the mobile user device and the emergency provider.

In an embodiment, to output the signal indicating that the mobile user device is to initiate the call to the emergency provider, the control circuit is configured to: transmit, via a head unit of the vehicle, the signal indicating that the mobile user device is to initiate the call to the emergency provider.

In an embodiment, the head unit of the vehicle is configured to generate a consumable data package for the mobile user device based on the incident data. The signal includes the consumable data package for the mobile user device.

In an embodiment, the consumable data package for the mobile user device includes information associated with the incident event. The mobile user device is configured to communicate at least a portion of the information associated with the incident event to the emergency provider.

In an embodiment, the information associated with the incident event includes data indicative at least one of: (i) a number of occupants, (ii) a heading of the vehicle, or (iii) a location of the vehicle.

In an embodiment, the control circuit is further configured to: output one or more signals to initiate a display of content for a user via a user interface of a display device within the vehicle. The content includes a message instructing the user to contact the emergency provider.

In an embodiment, the control circuit is further configured to determine that an audio output device of the vehicle has experienced a failure. The signal to the mobile user device indicates the mobile user device is to utilize an audio output device of the mobile user device for the call between the mobile user device and the emergency provider.

In an embodiment, the one or more sensors include at least one of: (i) an impact crash sensor, (ii) a seat belt sensor, (iii) an accelerometer, (iv) a gyroscope, or (v) a yaw rate sensor.

One example aspect of the present disclosure is directed to a computer-implemented method. The computer-implemented method includes obtaining, via one or more sensors, incident data descriptive of an incident event involving the vehicle. The computer-implemented method includes determining, based on the incident data, that an emergency provider is to be contacted. The computer-implemented method includes determining that the vehicle is unable to connect with the emergency provider using a communication unit of the vehicle. The computer-implemented method includes outputting, to a mobile user device paired to the vehicle through a short-range wireless protocol, a signal indicating that the mobile user device is to initiate a call to the emergency provider.

In an embodiment, the computer-implemented method includes outputting a signal to initiate a first call between the vehicle and the emergency provider using the communication unit of the vehicle.

In an embodiment, determining that the vehicle is unable to connect with the emergency provider using the communication unit of the vehicle includes: determining that, for the first call, the vehicle has failed to establish a first connection with a system associated with the emergency provider using the communication unit of the vehicle; transmitting a control signal to initiate a second call between the vehicle and the emergency provider using the communication unit of the vehicle; and determining that, for the second call, the vehicle has failed to establish a second connection with the system associated with the emergency provider using the communication unit of the vehicle.

In an embodiment, at least one of: (i) an audio output device of the vehicle is utilized for an audio output portion of the call between the mobile user device and the emergency provider, or (ii) an audio input device of the vehicle is utilized for an audible input portion of the call between the mobile user device to the emergency provider.

In an embodiment, outputting the signal indicating that the mobile user device is to initiate the call to the emergency provider includes transmitting, via a head unit of the vehicle, the signal indicating that the mobile user device is to initiate the call to the emergency provider.

In an embodiment, the signal indicating that the mobile user device is to initiate the call to the emergency provider includes information associated with the incident event. The mobile user device is configured to transmit at least a portion of the information associated with the incident event to the emergency provider.

In an embodiment, the mobile user device includes a downloaded software application associated with the vehicle. The mobile user device, via the software application, obtains vehicle data associated with the vehicle prior to the incident event. The mobile user device is configured to transmit at least a portion of the vehicle data to a system associated with the emergency provider.

One example aspect of the present disclosure is directed to one or more non-transitory computer-readable media that store instructions that are executable by a control circuit to: obtain, via one or more sensors, incident data descriptive of an incident event involving the vehicle; determine, based on the incident data, that an emergency provider is to be contacted; determine that the vehicle is unable to connect with the emergency provider using a communication unit of the vehicle; and output, to a mobile user device paired to the vehicle through a short-range wireless protocol, a signal indicating that the mobile user device is to initiate a call to the emergency provider.

In an embodiment, to determine that the vehicle is unable to connect with the emergency provider using the communication unit of the vehicle, the control circuit is configured to output one or more control signals to initiate a plurality of attempts to establish, using the communication unit, a communications connection between the vehicle and a system associated with the emergency provider until a threshold number of attempts is reached.

Other example aspects of the present disclosure are directed to other systems, methods, vehicles, apparatuses, tangible non-transitory computer-readable media, and devices for the technology described herein.

These and other features, aspects, and advantages of various implementations will become better understood with reference to the following description and appended claims. The accompanying drawings, which are incorporated in and constitute a part of this specification, illustrate implementations of the present disclosure and, together with the description, serve to explain the related principles.

BRIEF DESCRIPTION OF THE DRAWINGS

Detailed discussion of implementations directed to one of ordinary skill in the art are set forth in the specification, which makes reference to the appended figures, in which.

DETAILED DESCRIPTION

Figure 1:
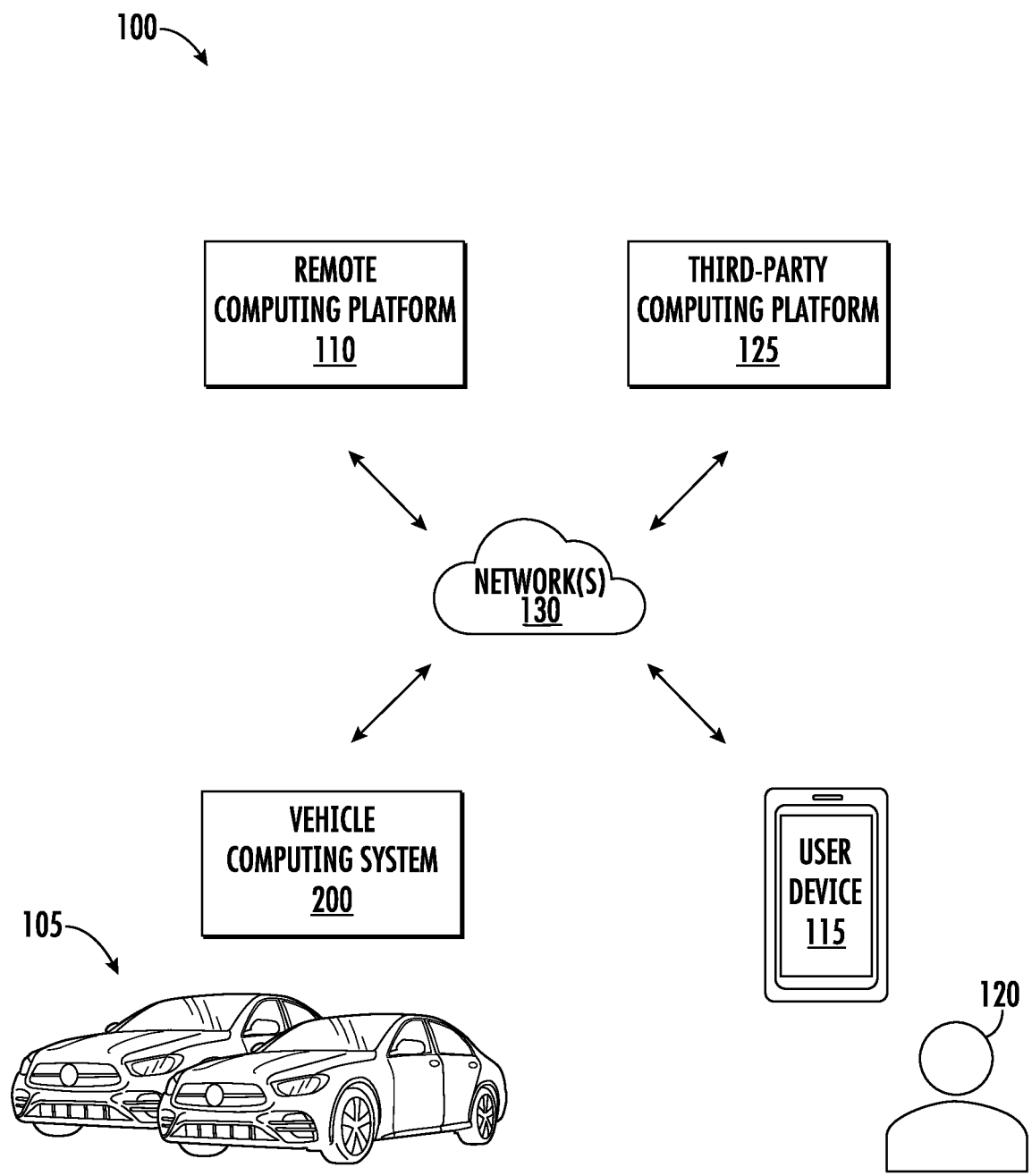
FIG. 1 illustrates an example computing ecosystem according to an embodiment hereof.

An aspect of the present disclosure relates to improving the ability of a vehicle to respond in the event of an incident that involves the vehicle. For instance, a tree may randomly fall into a road causing a collision between the tree and the vehicle. Such incident may be detected by processing the sensor data collected via the vehicle's onboard impact crash sensors, seat belt sensors, accelerometers, gyroscopes, yaw rate sensors, etc. In response, the vehicle may determine that the incident warrants an emergency call ("ecall"). However, in certain circumstances, the ability of the vehicle to place an emergency call using its own communication unit may be limited due, for example, to damaged telecommunications hardware.

To address this problem, the technology of the present disclosure allows the vehicle to detect that it is unable to contact an emergency provider using its onboard communication unit. This may include attempting several calls to the emergency provider via the vehicle's communication unit. Each call may fail to establish a connection with the emergency provider. The vehicle may determine that a threshold number of failed attempts has been made using its communication unit. In response, the vehicle may transmit a signal to a user device (e.g., the driver's phone) paired with the vehicle through a short-range wireless communication protocol (e.g., Bluetooth®). The signal may include a request for the user device to contact an emergency provider.

The user device may process the signal and call the emergency provider using the cellular networks (and corresponding towers) that are available to the user device for an emergency call. Upon connection with the emergency provider, the user device may utilize the speakers of the vehicle to broadcast the call with the emergency provider. In this way, the vehicle can leverage the expanded telecommunications network of a paired user device to improve its ability to contact an emergency provider in the event of an incident.

In some implementations, information associated with the incident may be transmitted to the emergency provider to help address the situation. For instance, the vehicle may access data indicating the number of occupants, a heading of the vehicle, a location of the vehicle, or other information reflecting the state of the vehicle during (or closely prior to) the time of the incident. This information can be packaged into a payload and transmitted to the paired user device using the short-range wireless communication protocol (e.g., via the vehicle's head unit). The user device may transmit this information to a computing system associated with the emergency provider. This may improve the ability of a human operator (or a programmed computing system) to facilitate a suitable emergency response for the incident.

The present disclosure provides a number of technical effects and computing improvements. For instance, the systems and methods of the present disclosure increase the telecommunications ability of a vehicle by leveraging computing devices that are paired with the vehicle. The computing devices may have access to a greater number of cellular networks or towers than the vehicle. As such, the technology of the present disclosure improves the ability of the vehicle to respond to circumstances where a third party (e.g., an emergency provider) should be contacted to assist the vehicle. This may be particularly useful when the vehicle's communication unit has been damaged or disabled.

The technology of the present disclosure also improves the onboard computing technology of the vehicle. For instance, the vehicle's onboard computing system may obtain incident data, via one or more sensors, descriptive of an incident event involving the vehicle. The vehicle computing system may determine, based on the incident data, that an emergency provider is to be contacted. The vehicle computing system may determine that the vehicle is unable to connect with the emergency provider using a communication unit of the vehicle. This determination can be made based on the vehicle being unable to connect with the emergency provider despite making a threshold number of attempts to do so. The vehicle computing system may output, to a mobile user device paired to the vehicle through a short-range wireless protocol, a signal indicating that the mobile user device is to initiate a call to the emergency provider. In this way, the vehicle computing system may first confirm that it is unable to connect with an emergency provider (e.g., using its own communication unit) before leveraging the mobile user device. Accordingly, the vehicle computing system can avoid wasting its own computing resources instructing the user device to connect with an emergency provider until after the vehicle has confirmed its inability to do so. In this way, the vehicle computing system can more efficiently utilize its computing resources, as well as that of the mobile user device.

The technology of the present disclosure may include the collection of data associated with a user in the event that the user expressly authorizes such collection. Such authorization may be provided by the user via explicit user input to a user interface in response to a prompt that expressly requests such authorization. Collected data may be anonymized, pseudonymized, encrypted, noised, securely stored, or otherwise protected. A user may opt out of such data collection at any time.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations may be made to the embodiments without departing from the scope or spirit of the present disclosure. For instance, features illustrated or described as part of one embodiment may be used with another embodiment to yield a still further embodiment. Thus, it is intended that aspects of the present disclosure cover such modifications and variations.

FIG. 1 illustrates an example computing ecosystem 100 according to an embodiment hereof. The ecosystem 100 may include a vehicle 105, a remote computing platform 110 (also referred to herein as computing platform 110), and a user device 115 associated with a user 120. The user 120 may be a driver of the vehicle. In some implementations, the user 120 may be a passenger of the vehicle. In some implementations, the computing ecosystem 100 may include a third party (3P) computing platform 125, as further described herein. The vehicle 105 may include a vehicle computing system 200 located onboard the vehicle 105. The computing platform 110, the user device 115, the third party computing platform 125, and/or the vehicle computing system 200 may be configured to communicate with one another via one or more networks 130.

The systems/devices of ecosystem 100 may communicate using one or more application programming interfaces (APIs). This may include external facing APIs to communicate data from one system/device to another. The external facing APIs may allow the systems/devices to establish secure communication channels via secure access channels over the networks 130 through any number of methods, such as web-based forms, programmatic access via RESTful APIs, Simple Object Access Protocol (SOAP), remote procedure call (RPC), scripting access, etc.

The computing platform 110 may include a computing system that is remote from the vehicle 105. In an embodiment, the computing platform 110 may include a cloud-based server system. The computing platform 110 may be associated with (e.g., operated by) an entity. For example, the remote computing platform 110 may be associated with an OEM that is responsible for the make and model of the vehicle 105. In another example, the remote computing platform 110 may be associated with a service entity contracted by the OEM to operate a cloud-based server system that provides computing services to the vehicle 105.

The computing platform 110 may include one or more back-end services for supporting the vehicle 105. The services may include, for example, tele-assist services, navigation/routing services, performance monitoring services, etc. The computing platform 110 may host or otherwise include one or more APIs for communicating data to/from a computing system 130 of the vehicle 105 or the user device 115. The computing platform 110 may include one or more inter-service APIs for communication among its microservices. In some implementations, the computing platform may include one or more RPCs for communication with the user device 115.

The computing platform 110 may include one or more computing devices. For instance, the computing platform 110 may include a control circuit and a non-transitory computer-readable medium (e.g., memory). The control circuit of the computing platform 110 may be configured to perform the various operations and functions described herein. Further description of the computing hardware and components of computing platform 110 is provided herein with reference to other figures.

The user device 115 may include a computing device owned or otherwise accessible to the user 120. For instance, the user device 115 may include a phone, laptop, tablet, wearable device (e.g., smart watch, smart glasses, headphones), personal digital assistant, gaming system, personal desktop devices, other hand-held devices, or other types of mobile or non-mobile user devices. As further described herein, the user device 115 may include one or more input components such as buttons, a touch screen, a joystick or other cursor control, a stylus, a microphone, a camera or other imaging device, a motion sensor, etc. The user device 115 may include one or more output components such as a display device (e.g., display screen), a speaker, etc. In an embodiment, the user device 115 may include a component such as, for example, a touchscreen, configured to perform input and output functionality to receive user input and present information for the user 120. The user device 115 may execute one or more instructions to run an instance of a software application and present user interfaces associated therewith, as further described herein. In an embodiment, the launch of a software application may initiate a user-network session with the computing platform 110.

The third-party computing platform 125 may include a computing system that is remote from the vehicle 105, remote computing platform 110, and user device 115. In an embodiment, the third-party computing platform 125 may include a cloud-based server system. The term "third-party entity" may be used to refer to an entity that is different than the entity associated with the remote computing platform 110. For example, as described herein, the remote computing platform 110 may be associated with an OEM that is responsible for the make and model of the vehicle 105. The third-party computing platform 125 may be associated with a supplier of the OEM, a maintenance provider, a mapping service provider, an emergency provider, or other types of entities. In another example, the third-party computing platform 125 may be associated an entity that owns, operates, manages, etc. a software application that is available to or downloaded on the vehicle computing system 200.

The third-party computing platform 125 may include one or more back-end services provided by a third-party entity. The third-party computing platform 125 may provide services that are accessible by the other systems and devices of the ecosystem 100. The services may include, for example, mapping services, routing services, search engine functionality, maintenance services, entertainment services (e.g., music, video, images, gaming, graphics), emergency services (e.g., roadside assistance, 911 support), or other types of services. The third-party computing platform 125 may host or otherwise include one or more APIs for communicating data to/from the third-party computing system 125 to other systems/devices of the ecosystem 100.

The networks 130 may be any type of network or combination of networks that allows for communication between devices. In some implementations, the networks 130 may include one or more of a local area network, wide area network, the Internet, secure network, cellular network, mesh network, peer-to-peer communication link or some combination thereof and may include any number of wired or wireless links. Communication over the networks 130 may be accomplished, for instance, via a network interface using any type of protocol, protection scheme, encoding, format, packaging, etc. In an embodiment, communication between the vehicle computing system 200 and the user device 115 may be facilitated by near field or short range communication techniques (e.g., Bluetooth low energy protocol, radio frequency signaling, NFC protocol).

The vehicle 105 may be a vehicle that is operable by the user 120. In an embodiment, the vehicle 105 may be an automobile or another type of ground-based vehicle that is manually driven by the user 120. For example, the vehicle 105 may be a Mercedes-Benz® car or van. In some implementations, the vehicle 105 may be an aerial vehicle (e.g., a personal airplane) or a water-based vehicle (e.g., a boat). The vehicle 105 may include operator-assistance functionality such as cruise control, advanced driver assistance systems, etc. In some implementations, the vehicle 105 may be a fully or semi-autonomous vehicle.

The vehicle 105 may include a powertrain and one or more power sources. The powertrain may include a motor (e.g., an internal combustion engine, electric motor, or hybrid thereof), e-motor (e.g., electric motor), transmission (e.g., automatic, manual, continuously variable), driveshaft, axles, differential, e-components, gear, etc. The power sources may include one or more types of power sources. For example, the vehicle 105 may be a fully electric vehicle (EV) that is capable of operating a powertrain of the vehicle 105 (e.g., for propulsion) and the vehicle's onboard functions using electric batteries. In an embodiment, the vehicle 105 may use combustible fuel. In an embodiment, the vehicle 105 may include hybrid power sources such as, for example, a combination of combustible fuel and electricity.

The vehicle 105 may include a vehicle interior. The vehicle interior may include the area inside of the body of the vehicle 105 including, for example, a cabin for users of the vehicle 105. The interior of the vehicle 105 may include seats for the users, a steering mechanism, accelerator interface, braking interface, etc. The interior of the vehicle 105 may include a display device such as a display screen associated with an infotainment system, as further described with respect to FIG. 3.

The vehicle 105 may include a vehicle exterior. The vehicle exterior may include the outer surface of the vehicle 105. The vehicle exterior may include one or more lighting elements (e.g., headlights, brake lights, accent lights). The vehicle 105 may include one or more doors for accessing the vehicle interior by, for example, manipulating a door handle of the vehicle exterior. The vehicle 105 may include one or more windows, including a windshield, door windows, passenger windows, rear windows, sunroof, etc.

The systems and components of the vehicle 105 may be configured to communicate via a communication channel. The communication channel may include one or more data buses (e.g., controller area network (CAN)), on-board diagnostics connector (e.g., OBD-II), or a combination of wired or wireless communication links. The onboard systems may send or receive data, messages, signals, etc. amongst one another via the communication channel.

In an embodiment, the communication channel may include a direct connection, such as a connection provided via a dedicated wired communication interface, such as a RS-232 interface, a universal serial bus (USB) interface, or via a local computer bus, such as a peripheral component interconnect (PCI) bus. In an embodiment, the communication channel may be provided via a network. The network may be any type or form of network, such as a personal area network (PAN), a local-area network (LAN), Intranet, a metropolitan area network (MAN), a wide area network (WAN), or the Internet. The network may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol.

In an embodiment, the systems/devices of the vehicle 105 may communicate via an intermediate storage device, or more generally an intermediate non-transitory computer-readable medium. For example, the non-transitory computer-readable medium 140, which may be external to the computing system 130, may act as an external buffer or repository for storing information. In such an example, the computing system 130 may retrieve or otherwise receive the information from the non-transitory computer-readable medium 140.

Certain routine and conventional components of vehicle 105 (e.g., an engine) are not illustrated and/or discussed herein for the purpose of brevity. One of ordinary skill in the art will understand the operation of conventional vehicle components in vehicle 105.

The vehicle 105 may include a vehicle computing system 200. As described herein, the vehicle computing system 200 that is onboard the vehicle 105. For example, the computing devices and components of the vehicle computing system 200 may be housed, located, or otherwise included on or within the vehicle 105. The vehicle computing system 200 may be configured to execute the computing functions and operations of the vehicle 105.

Figure 2A:
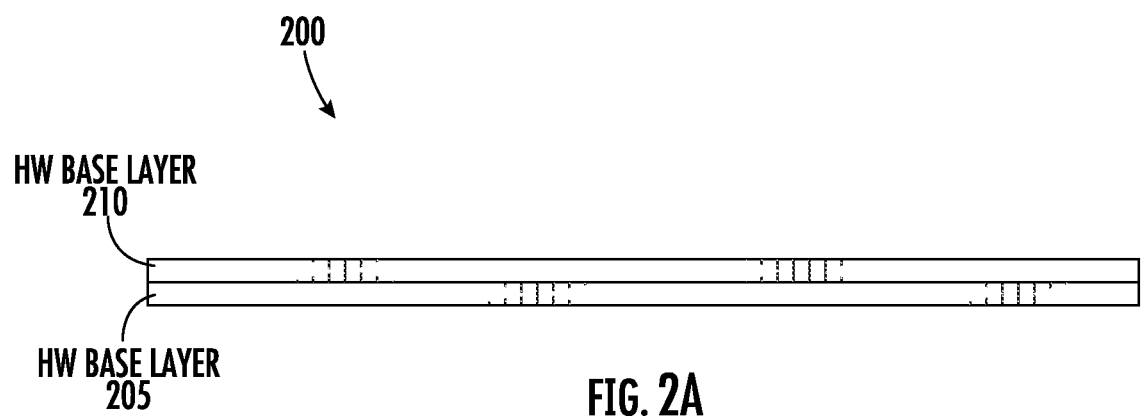
FIGS. 2A-D illustrate diagrams of an example computing architecture for an onboard computing system of a vehicle according to an embodiment hereof.

FIG. 2A illustrates an overview of an operating system of the vehicle computing system 105. The operating system may be a layered operating system. The vehicle computing system 200 may include a hardware layer 205 and a software layer 210. The hardware and software layers 205, 210 may include sub-layers. In some implementations, the operating system of the vehicle computing system 200 may include other layers (e.g., above, below, or in between those shown in FIG. 2A). In an example, the hardware layer 205 and the software layer 210 can be standardized base layers of the vehicle's operating system.

Figure 2B:
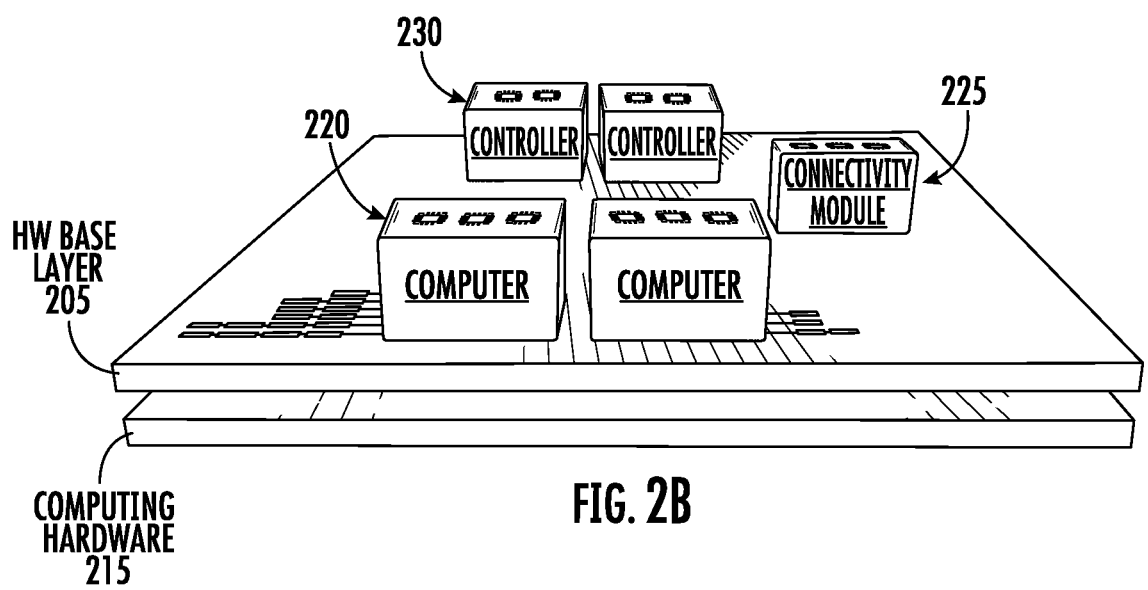

FIG. 2B illustrates a diagram of the hardware layer 205 of the vehicle computing system 200. In the layered operating system of the vehicle computing system 200, the hardware layer 205 can reside between the physical computing hardware 215 onboard the vehicle 105 and the software (e.g., of software layer 210) that runs onboard the vehicle 105.

The hardware layer 205 may be an abstraction layer including computing code that allows for communication between the software and the computing hardware 215 in the vehicle computing system 200. For example, the hardware layer 205 may include interfaces and calls that allow the vehicle computing system 200 to generate a hardware-dependent instruction to the computing hardware 215 (e.g., processors, memories, etc.) of the vehicle 105.

The hardware layer 205 may be configured to help coordinate the hardware resources. The architecture of the hardware layer 205 may be serviced oriented. The services may help provide the computing capabilities of the vehicle computing system 105. For instance, the hardware layer 205 may include the domain computers 220 of the vehicle 105, which may host various functionality of the vehicle 105 such as the vehicle's intelligent functionality. The specification of each domain computer may be tailored to the functions and the performance requirements where the services are abstracted to the domain computers. By way of example, this permits certain processing resources (e.g., graphical processing units) to support the functionality of a central in-vehicle infotainment computer for rendering graphics across one or more display devices for navigation, games, etc. or to support an intelligent automated driving computer to achieve certain industry assurances.

The hardware layer 205 may be configured to include a connectivity module 225 for the vehicle computing system 200. The connectivity module may include code/instructions for interfacing with the communications hardware of the vehicle 105. This can include, for example, interfacing with a communications controller, receiver, transceiver, transmitter, port, conductors, or other hardware for communicating data/information. The connectivity module 225 may allow the vehicle computing system 200 to communicate with other computing systems that are remote from the vehicle 105 including, for example, remote computing platform 110 (e.g., an OEM cloud platform).

The architecture design of the hardware layer 205 may be configured for interfacing with the computing hardware 215 for one or more vehicle control units 225. The vehicle control units 225 may be configured for controlling various functions of the vehicle 105. This may include, for example, a central exterior and interior controller (CEIC), a charging controller, or other controllers as further described herein.

Figure 2C:
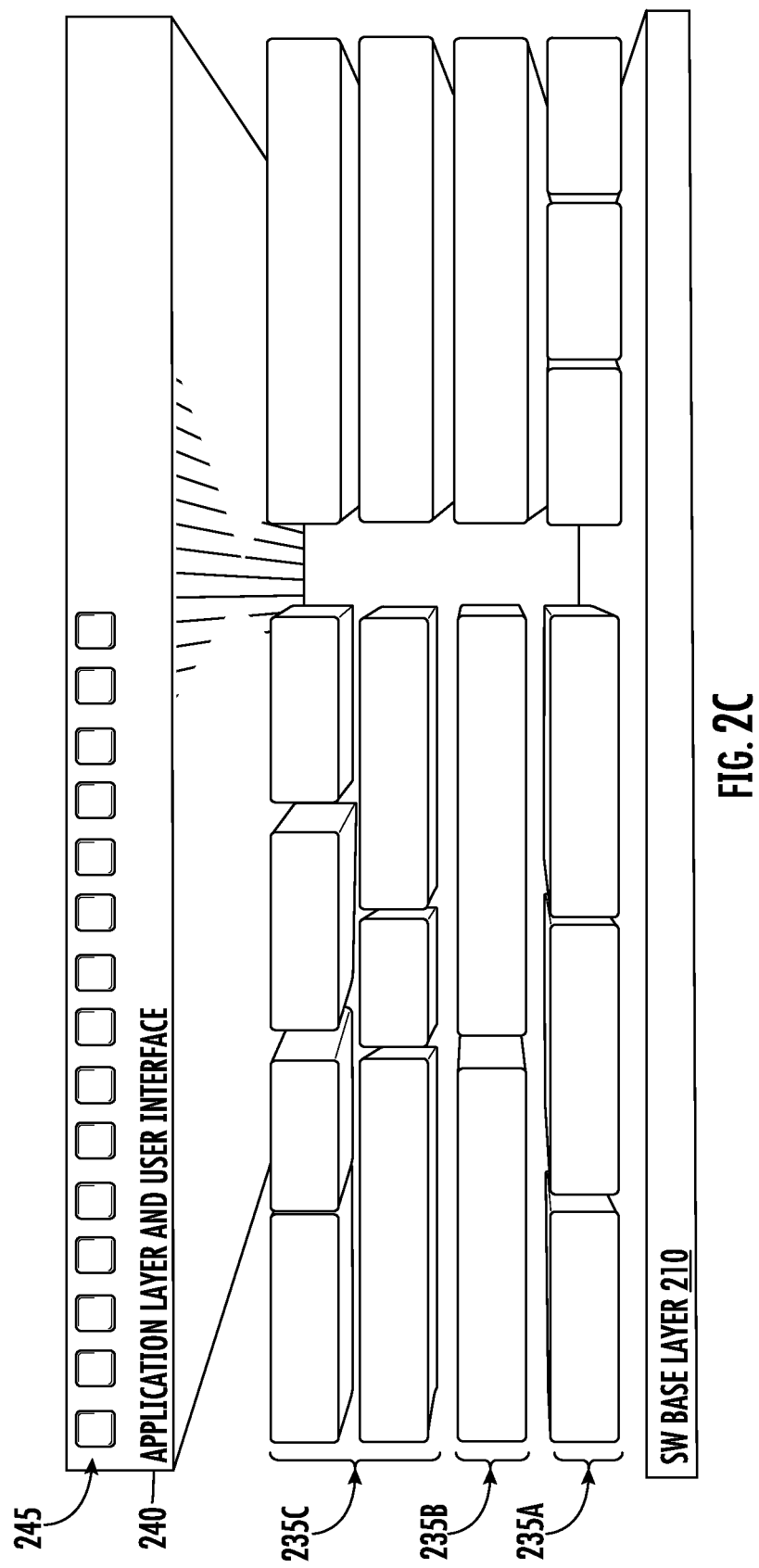

The software layer 205 may be configured to provide software operations for executing various types of functionality and applications of the vehicle 105. FIG. 2C illustrates a diagram of the software layer 210 of the vehicle computing system 200. The architecture of the software layer 210 may be service oriented and may be configured to provide software for various functions of the vehicle computing system 200. To do so, the software layer 210 may include a plurality of sublayers 235A-E. For instance, the software layer 210 may include a first sublayer 235A including firmware (e.g., audio firmware) and a hypervisor, a second sublayer 235B including operating system components (e.g., open-source components), and a third sublayer 235C including middleware (e.g., for flexible integration with applications developed by an associated entity or third-party entity).

The vehicle computing system 200 may include an application layer 240. The application layer 240 may allow for integration with one or more software applications 245 that are downloadable or otherwise accessible by the vehicle 105. The application layer 240 may be configured, for example, using containerized applications developed by a variety of different entities.

Figure 2D:
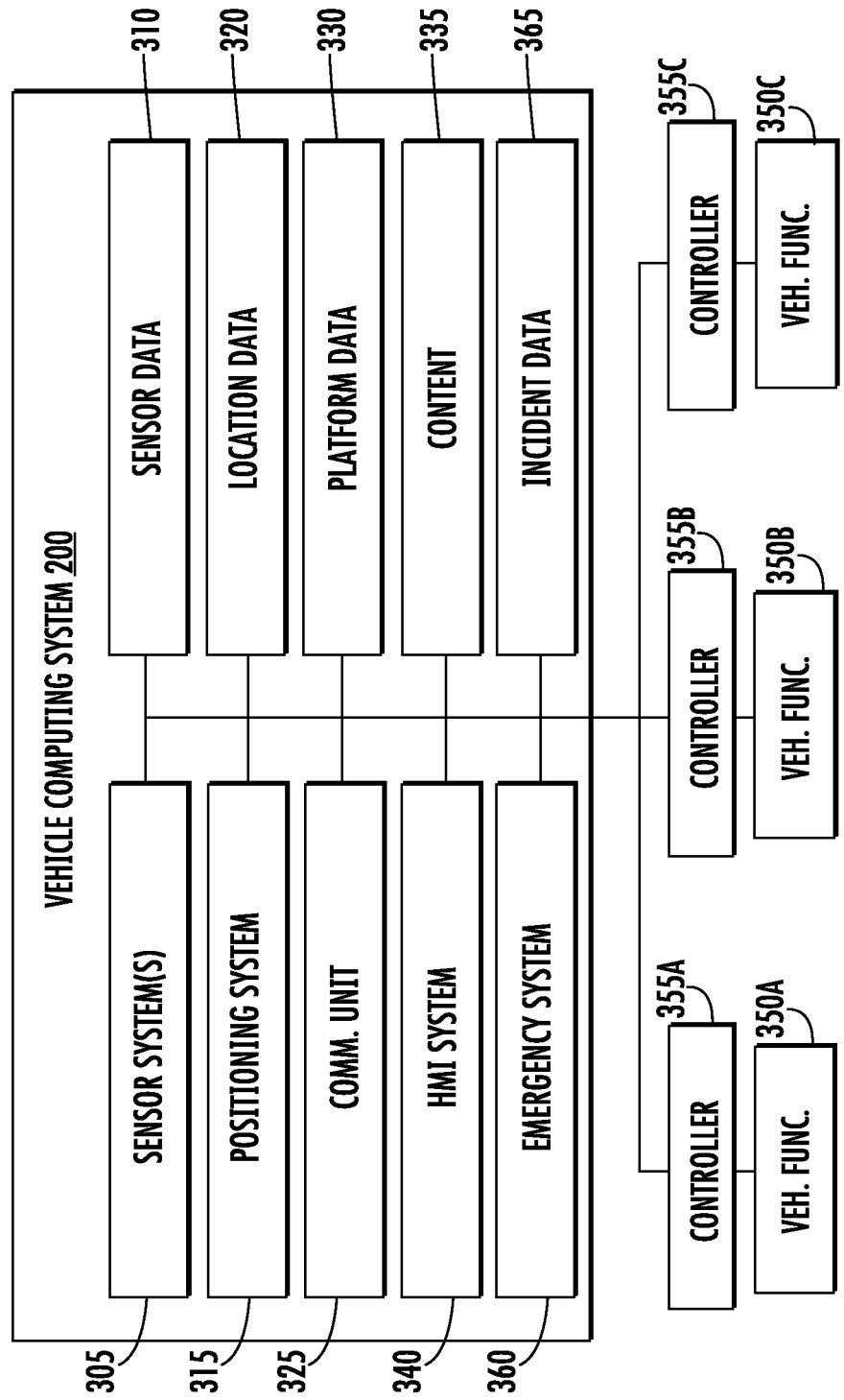

The layered operating system and the vehicle's onboard computing resources may allow the vehicle computing system 200 to collect and communicate data as well as operate the systems implemented onboard the vehicle 105. FIG. 2D illustrates a block diagram of example systems and data of the vehicle 105.

The vehicle 105 may include one or more sensor systems 305. A sensor system may include or otherwise be in communication with a sensor of the vehicle 105 and a module for processing sensor data 310 associated with the sensor configured to acquire the sensor data 305. This may include sensor data 310 associated with the surrounding environment of the vehicle 105, sensor data associated with the interior of the vehicle 105, or sensor data associated with a particular vehicle function. The sensor data 310 may be indicative of conditions observed in the interior of the vehicle, exterior of the vehicle, or in the surrounding environment. For instance, the sensor data 305 may include image data, inside/outside temperature data, weather data, data indicative of a position of a user/object within the vehicle 105, weight data, motion/gesture data, audio data, or other types of data. The sensors may include one or more: cameras (e.g., visible spectrum cameras, infrared cameras), motion sensors, audio sensors (e.g., microphones), weight sensors (e.g., for a vehicle a seat), temperature sensors, humidity sensors, Light Detection and Ranging (LIDAR) systems, Radio Detection and Ranging (RADAR) systems, or other types of sensors. The vehicle 105 may include other sensors configured to acquire data associated with the vehicle 105. For example, the vehicle 105 may include inertial measurement units, wheel odometry devices, or other sensors.

The vehicle 105 may include a positioning system 315. The positioning system 315 may be configured to generate location data 320 (also referred to as position data) indicative of a location (also referred to as a position) of the vehicle 105. For example, the positioning system 315 may determine location by using one or more of inertial sensors (e.g., inertial measurement units, etc.), a satellite positioning system, based on IP address, by using triangulation and/or proximity to network access points or other network components (e.g., cellular towers, WiFi access points, etc.), or other suitable techniques. The positioning system 315 may determine a current location of the vehicle 105. The location may be expressed as a set of coordinates (e.g., latitude, longitude), an address, a semantic location (e.g., "at work"), etc.

In an embodiment, the positioning system 315 may be configured to localize the vehicle 105 within its environment. For example, the vehicle 105 may access map data that provides detailed information about the surrounding environment of the vehicle 105. The map data may provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location, timing, or instructions of signage (e.g., stop signs, yield signs), traffic lights (e.g., stop lights), or other traffic signals or control devices/markings (e.g., cross walks)); or any other data. The positioning system 315 may localize the vehicle 105 within the environment (e.g., across multiple axes) based on the map data. For example, the positioning system 155 may process certain sensor data 310 (e.g., LIDAR data, camera data, etc.) to match it to a map of the surrounding environment to get an understanding of the vehicle's position within that environment. The determined position of the vehicle 105 may be used by various systems of the vehicle computing system 200 or another computing system (e.g., the remote computing platform 110, the third-party computing platform 125, the user device 115).

The vehicle 105 may include a communications unit 325 configured to allow the vehicle 105 (and its vehicle computing system 200) to communicate with other computing devices. The vehicle computing system 200 may use the communications unit 325 to communicate with the remote computing platform 110 or one or more other remote computing devices over a network 130 (e.g., via one or more wireless signal connections). For example, the vehicle computing system 200 may utilize the communications unit 325 to receive platform data 330 from the computing platform 110. This may include, for example, an over-the-air (OTA) software update for the operating system of the vehicle computing system 200. Additionally, or alternatively, the vehicle computing system 200 may utilize the communications unit 325 to send vehicle data 335 to the computing platform 110. The vehicle data 335 may include any data acquired onboard the vehicle 105 including, for example, sensor data 310, location data 320, diagnostic data, user input data, data indicative of current software versions or currently running applications, occupancy data, data associated with the user 120 of the vehicle 105, or other types of data obtained (e.g., acquired, accessed, generated, downloaded, etc.) by the vehicle computing system 200.

In some implementations, the communications unit 325 may allow communication among one or more of the systems on-board the vehicle 105.

In an embodiment, the communications unit 325 may be configured to allow the vehicle 105 to communicate with or otherwise receive data from the user device 115 (shown in FIG. 1). The communications unit 325 may utilize various communication technologies such as, for example, Bluetooth low energy protocol, radio frequency signaling, or other short range or near filed communication technologies. The communications unit 325 may include any suitable components for interfacing with one or more networks, including, for example, transmitters, receivers, ports, controllers, antennas, or other suitable components that may help facilitate communication.

The vehicle 105 may include one or more human-machine interfaces (HMIs) 340. The human-machine interfaces 340 may include a display device, as described herein. The display device (e.g., touchscreen) may be viewable by a user of the vehicle 105 (e.g., user 120) that is located in the front of the vehicle 105 (e.g., driver's seat, front passenger seat). Additionally, or alternatively, a display device (e.g., rear unit) may be viewable by a user that is located in the rear of the vehicle 105 (e.g., back passenger seats). The human-machine interfaces 340 may present content 335 via a user interface for display to a user 120.

Figure 3:
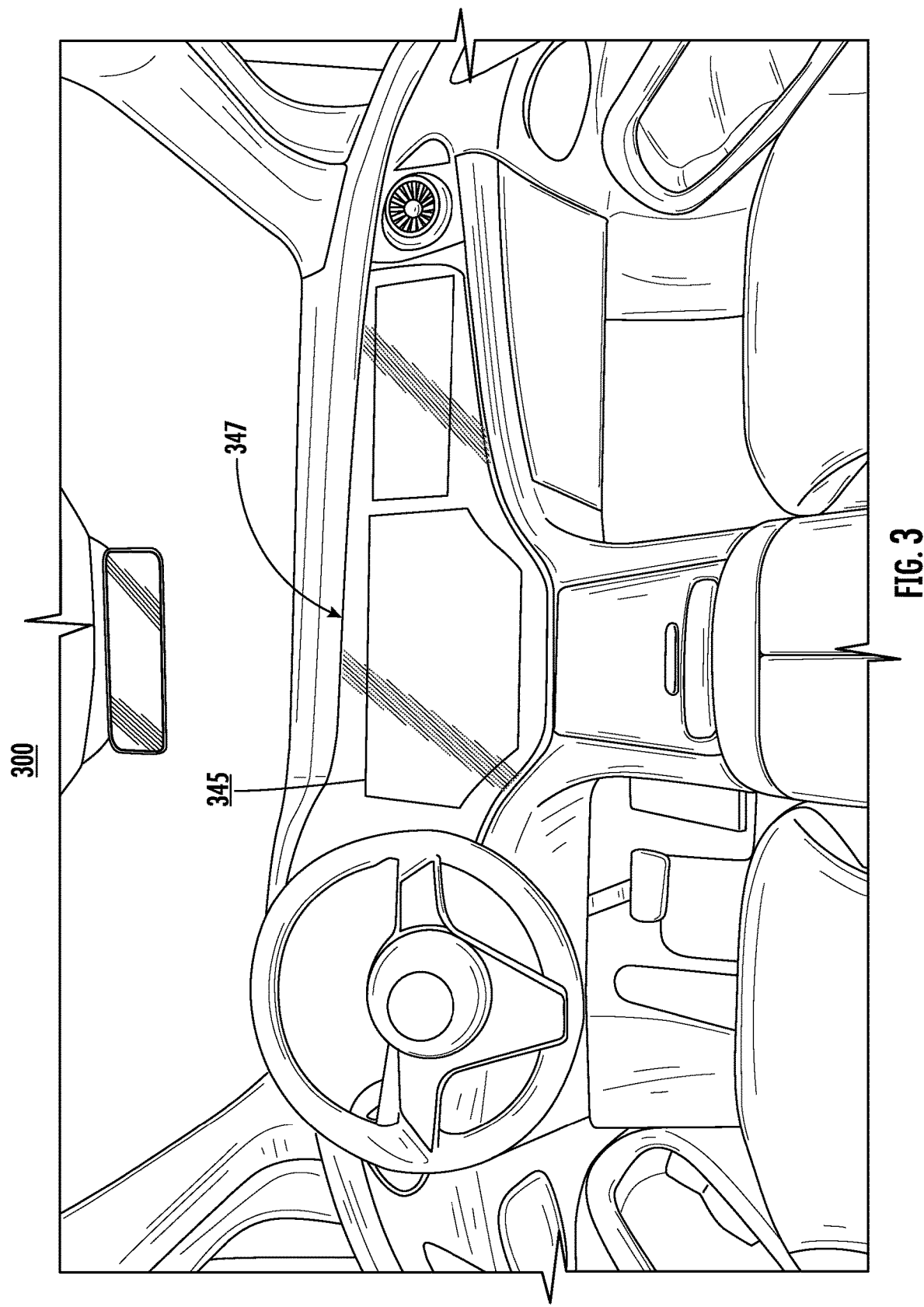
FIG. 3 illustrates an example vehicle interior with an example display according to an embodiment hereof.

FIG. 3 illustrates an example vehicle interior 300 with a display device 345. The display device 345 may be a component of the vehicle's infotainment system. Such a component may be referred to as a display device of the infotainment system or be considered as a device for implementing an embodiment that includes the use of an infotainment system. For illustrative and example purposes, such a component may be referred to herein as a head unit display device (e.g., positioned in a front/dashboard area of the vehicle interior), a rear unit display device (e.g., positioned in the back passenger area of the vehicle interior), an infotainment head unit or rear unit, or the like. The display device 345 may be located on, form a portion of, or function as a dashboard of the vehicle 105. The display device 345 may include a display screen, CRT, LCD, plasma screen, touch screen, TV, projector, tablet, and/or other suitable display components.

The display device 345 may display a variety of content to the user 120 including information about the vehicle 105, prompts for user input, etc. The display device 345 may include a touchscreen through which the user 120 may provide user input to a user interface.

For example, the display device 345 may include user interface rendered via a touch screen that presents various content. The content may include vehicle speed, mileage, fuel level, charge range, navigation/routing information, audio selections, streaming content (e.g., video/image content), internet search results, comfort settings (e.g., temperature, humidity, seat position, seat massage), or other vehicle data 335. The display device 345 may render content to facilitate the receipt of user input. For instance, the user interface of the display device 345 may present one or more soft buttons with which a user 120 can interact to adjust various vehicle functions (e.g., navigation, audio/streaming content selection, temperature, seat position, seat massage, etc.). Additionally, or alternatively, the display device 345 may be associated with an audio input device (e.g., microphone) for receiving audio input from the user 120.

Returning to FIG. 2D, the vehicle 105 may include an emergency system 360. The emergency system 365 may be configured to obtain incident data 365. The incident data 365 may be indicative of an incident event including the vehicle 105. For example, the incident data 365 may include sensor data 310 from one or more sensors such as an airbag sensor, an impact sensor configured to detect an impact to the vehicle 105 by another object, a sensor configured to detect damaged vehicle components, a sensor configured to detect broken wired or wireless connections, etc. The incident event may include an accident, collision with an object (e.g., other vehicle, tree, guard rail), an unsafe vehicle maneuver (e.g., rollover, swerve offroad), etc. In some implementations, the emergency system 360 may be included in the communications system 325.

The vehicle 105 may include a plurality of vehicle functions 350A-C. A vehicle function 350A-C may be a functionality that the vehicle 105 is configured to perform based on a detected input. The vehicle functions 350A-C may include one or more: (i) vehicle comfort functions; (ii) vehicle staging functions; (iii) vehicle climate functions; (vi) vehicle navigation functions; (v) drive style functions; (v) vehicle parking functions; or (vi) vehicle entertainment functions. The user 120 may interact with a vehicle function 250A-C through user input (e.g., to an adjustable input device, UI element) that specifies a setting of the vehicle function 250A-C selected by the user.

Each vehicle function may include a controller 355A-C associated with that particular vehicle function 355A-C. The controller 355A-C for a particular vehicle function may include control circuitry configured to operate its associated vehicle function 355A-C. For example, a controller may include circuitry configured to turn the seat heating function on, to turn the seat heating function off, set a particular temperature or temperature level, etc.

In an embodiment, a controller 355A-C for a particular vehicle function may include or otherwise be associated with a sensor that captures data indicative of the vehicle function being turned on or off, a setting of the vehicle function, etc. For example, a sensor may be an audio sensor or a motion sensor. The audio sensor may be a microphone configured to capture audio input from the user 120. For example, the user 120 may provide a voice command to activate the radio function of the vehicle 105 and request a particular station. The motion sensor may be a visual sensor (e.g., camera), infrared, RADAR, etc. configured to capture a gesture input from the user 120. For example, the user 120 may provide a hand gesture motion to adjust a temperature function of the vehicle 105 to lower the temperature of the vehicle interior.

The controllers 355A-C may be configured to send signals to another onboard system. The signals may encode data associated with a respective vehicle function. The encoded data may indicate, for example, a function setting, timing, etc. In an example, such data may be used to generate content for presentation via the display device 345 (e.g., showing a current setting). Additionally, or alternatively, such data can be included in vehicle data 335 and transmitted to the computing platform 110.

Figure 4:
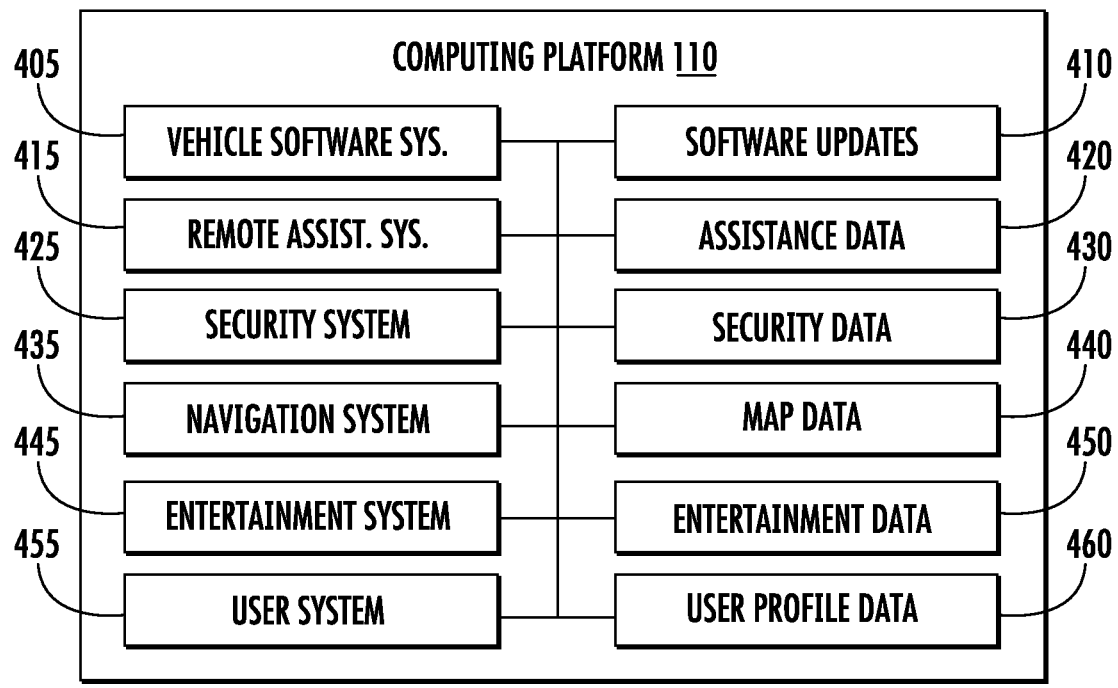
FIG. 4 illustrates a diagram of an example computing platform that is remote from a vehicle according to an embodiment hereof.

FIG. 4 illustrates a diagram of computing platform 110, which is remote from a vehicle according to an embodiment hereof. As described herein, the computing platform 110 may include a cloud-based computing platform.

In some implementations, the computing platform 110 may be implemented on a server, combination of servers, or a distributed set of computing devices which communicate over a network. For instance, the computing platform 110 may be distributed using one or more physical servers, private servers, or cloud computing. In some examples, the computing platform 110 may be implemented as a part of or in connection with one or more microservices, where, for example, an application is architected into independent services that communicate over APIs. Microservices may be deployed in a container (e.g., standalone software package for a software application) using a container service, or on VMs (virtual machines) within a shared network. Example microservices may include a microservice associated with the vehicle software system 405, remote assistance system 415, etc. A container service may be a cloud service that allows developers to upload, organize, run, scale, manage, and stop containers using container-based virtualization to orchestrate the respective actions. A VM may include virtual computing resources which are not limited to a physical computing device. In some examples, the computing platform 110 may include or access one or more data stores for storing data associated with the one or more microservices. For instance, data stores may include distributed data stores, fully managed relational, NoSQL, and in-memory databases, etc.

In an example, the computing platform 110 may include a vehicle software system 405 that is configured to provide the vehicle 105 with one or more software updates 410. The vehicle software system 405 can maintain a data structure (e.g., list, table) that indicates the current software or versions thereof downloaded to a particular vehicle. The vehicle software system 405 may also maintain a data structure indicating software packages or versions that are to be downloaded by the particular vehicle. In some implementations, the vehicle computing system 405 may maintain a data structure that indicates the computing hardware, charging hardware, or other hardware resources onboard a particular vehicle. These data structures can be organized by vehicle identifier (e.g., VIN) such that the computing platform 110 can perform a look-up function, based on the vehicle identifier, to determine the associated software (and updates) for a particular vehicle.

When the vehicle 105 is connected to the computing platform 110 and is available to update its software, the vehicle 105 can request a software update from the computing platform 110. The computing platform 110 can provide the vehicle 105 one or more software updates 410 as over-the-air software updates via a network 130.

The computing platform 110 may include a remote assistance system 415. The remote assistance system 415 may provide assistance to the vehicle 105. This can include providing information to the vehicle 105 to assist with charging (e.g., charging locations recommendations), remotely controlling the vehicle (e.g., for AV assistance), roadside assistance (e.g., for collisions, flat tires), etc. The remote assistance system 415 may obtain assistance data 420 to provide its core functions. The assistance data 420 may include information that may be helpful for the remote assistance system 415 to assist the vehicle 105. This may include information related to the vehicle's current state, an occupant's current state, the vehicle's location, the vehicle's route, charge/fuel level, incident data, etc. In some implementations, the assistance data 420 may include the vehicle data 335.

The remote assistance system 415 may transmit data or command signals to provide assistance to the vehicle 105. This may include providing data indicative of relevant charging locations, remote control commands to move the vehicle, connect to an emergency provider, etc.

The computing platform 110 may include a security system 425. The security system 425 can be associated with one or more security-related functions for accessing the computing platform 110 or the vehicle 105. For instance, the security system 425 can process security data 430 for identifying digital keys, data encryption, data decryption, etc. for accessing the services/systems of the computing platform 110. Additionally, or alternatively, the security system 425 can store security data 430 associated with the vehicle 105. A user 120 can request access to the vehicle 105 (e.g., via the user device 115). In the event the request includes a digital key for the vehicle 105 as indicated in the security data 430, the security system 425 can provide a signal to lock (or unlock) the vehicle 105.

The computing platform 110 may include a navigation system 435 that provides a back-end routing and navigation service for the vehicle 105. The navigation system 435 may provide map data 440 to the vehicle 105. The map data 440 may be utilized by the positioning system 315 of the vehicle 105 to determine a location of the vehicle 105, a point of interest, etc. The navigation system 435 may also provide routes to destinations requested by the vehicle 105 (e.g., via user input to the vehicle's head unit). The routes can be provided as a portion of the map data 440 or as separate routing data. Data provided by the navigation system 435 can be presented as content on the display device 345 of the vehicle 105.

The computing platform 110 may include an entertainment system 445. The entertainment system 445 may access one or more databases for entertainment data 450 for a user 120 of the vehicle 105. In some implementations, the entertainment system 445 may access entertainment data 450 from another computing system associated with a third-party service provider of entertainment content. The entertainment data 450 may include media content such as music, videos, gaming data, etc. The entertainment data 450 may be provided to vehicle 105, which may output the entertainment data 450 as content 335 via one or more outputs devices of the vehicle 105 (e.g., display device, speaker, etc.).

The computing platform 110 may include a user system 455. The user system 455 may create, store, manage, or access user profile data 460. The user profile data 460 may include a plurality of user profiles, each associated with a respective user 120. A user profile may indicate various information about a respective user 120 including the user's preferences (e.g., for music, comfort settings), frequented/past destinations, past routes, etc. The user profiles may be stored in a secure database. In some implementations, when a user 120 enters the vehicle 120, the user's key (or user device) may provide a signal with a user or key identifier to the vehicle 105. The vehicle 105 may transmit data indicative of the identifier (e.g., via its communications system 325) to the computing platform 110. The computing platform 110 may look-up the user profile of the user 120 based on the identifier and transmit user profile data 460 to the vehicle computing system 200 of the vehicle 105. The vehicle computing system 200 may utilize the user profile data 460 to implement preferences of the user 120, present past destination locations, etc. The user profile data 460 may be updated based on information periodically provided by the vehicle 105. In some implementations, the user profile data 460 may be provided to the user device 120.

Figure 5:
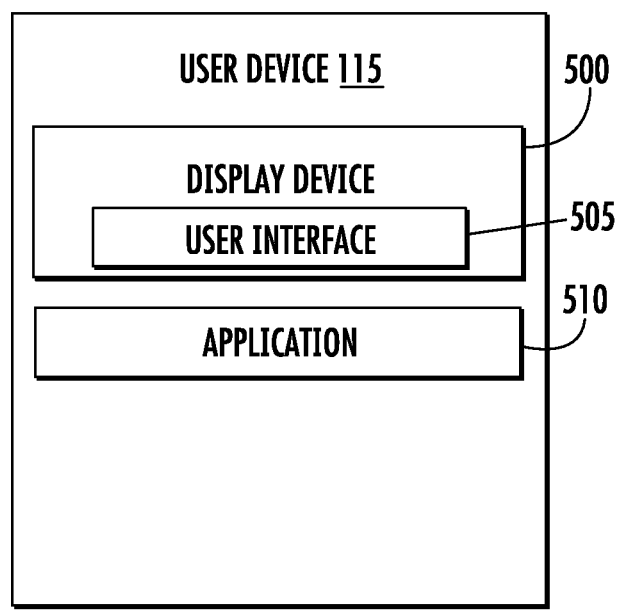
FIG. 5 illustrates a diagram of an example user device according to an embodiment hereof.

FIG. 5 illustrates a diagram of example components of user device 115 according to an embodiment hereof. The user device 115 may include a display device 500 configured to render content via a user interface 505 for presentation to a user 120. The display device 500 may include a display screen, CRT, LCD, plasma screen, touch screen, TV, projector, tablet, or other suitable display components. The user device 115 may include a software application 510 that is downloaded and runs on the user device 115. In some implementations, the software application 510 may be associated with the vehicle 105 or an entity associated with the vehicle 105 (e.g., manufacturer, retailer, maintenance provider). In an example, the software application 510 may enable the user device 115 to communicate with the computing platform 110 and the services thereof.

The user device 115 may be configured to pair with the vehicle 105 via a short-range wireless protocol. The short-range wireless protocol may include, for example, at least one of Bluetooth®, Wi-Fi, ZigBee, UWB, IR. The user device 115 may pair with the vehicle 105 through one or more known pairing techniques. For example, the user device 115 and the vehicle 105 may exchange information (e.g., addresses, device names, profiles) and store such information in their respective memories. Pairing may include an authentication process whereby the user 120 validates the connection between the user device 115 and the vehicle 105.

Once paired, the vehicle 105 and the user device 115 may exchange signals, data, etc. through the established communication channel. For example, the head unit 347 of the vehicle 105 may exchange signals with the user device 115.

The technology of the present disclosure allows the vehicle computing system 200 to extend its computing capabilities by leveraging the computing resources of the user device 110. More particularly, the vehicle computing system 200 may leverage the user device 115 to access an emergency provider in the event of an incident involving the vehicle 105. As described herein, this technology can overcome potential drawbacks introduced by computing resources of the vehicle 105 that may have been damaged during an incident, while also extending the ability of the vehicle 105 to respond to an incident event.

Figure 6:
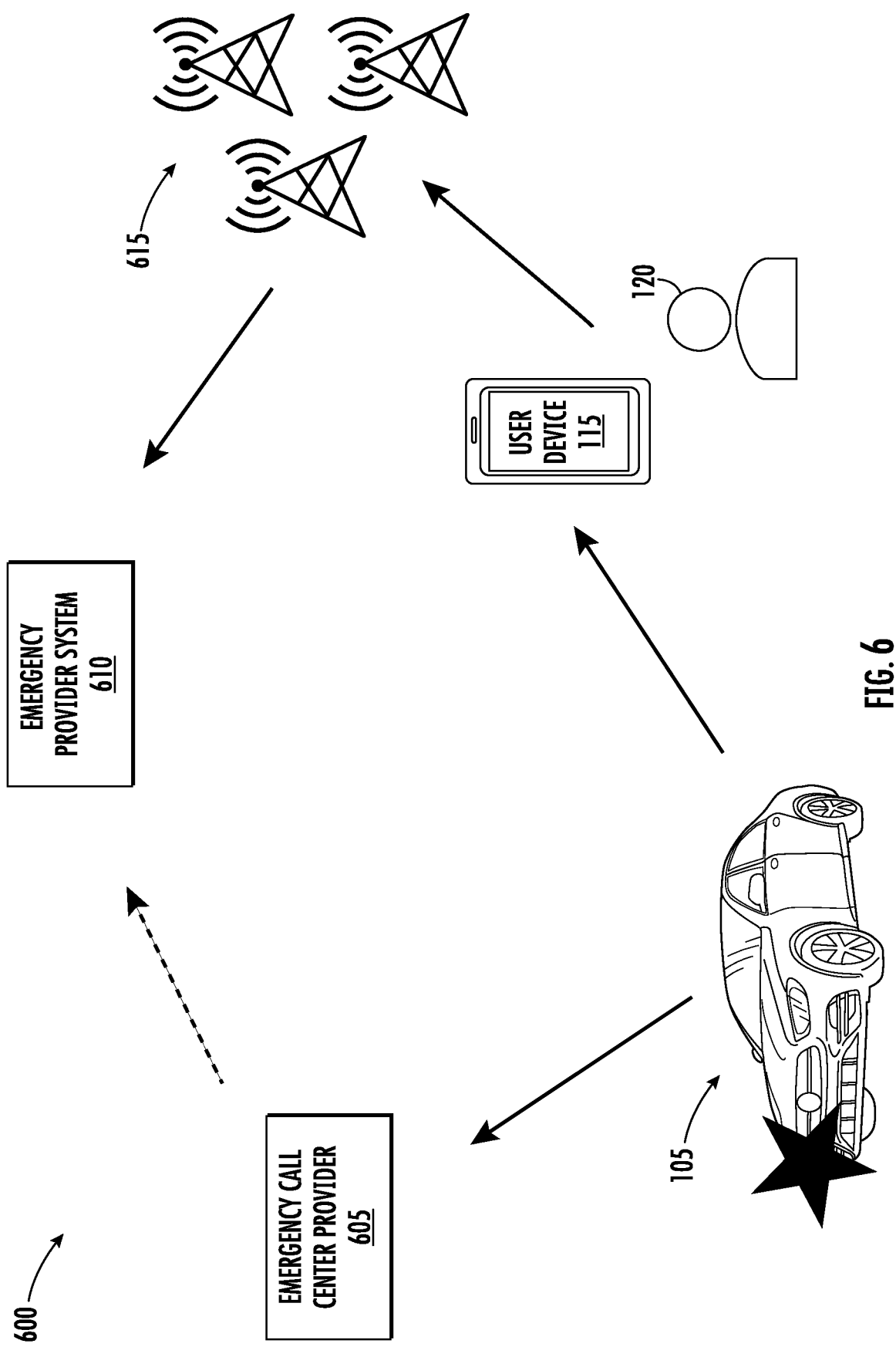
FIG. 6 illustrates a diagram of an example telecommunications ecosystem according to an embodiment hereof.

For example, FIG. 6 illustrates a telecommunications ecosystem 600 according to an embodiment hereof. As shown in FIG. 6, the vehicle 105 may be configured to communicate with a single emergency call center provider 605. In an example, the emergency call center provider 605 may be dedicated (or operated by) to the manufacturer of the vehicle 105 or an entity associated therewith. The vehicle 105 (e.g., the emergency system 360) may determine an occurrence of an incident event including the vehicle 105. Based on the determination, the vehicle 105 may call the emergency call center provider 605 via the vehicle's communication unit 325. The emergency call center provider 605 may communicate with an emergency provider by connecting with an emergency provider system 610, a computing system associated with the emergency provider.

The user device 115 may be configured to communicate with via one or more networks. This can include one or more cellular networks or one or more internet networks. In an example, the user device 115 may be configured to access any one of a plurality of cell towers 615 for establishing a call to an emergency provider. This may include accessing a closest cell tower, regardless of whether the tower is operated by the cellular provider of the user device 115. In this way, the user device 115 has an increased ability to achieve an emergency call than the vehicle 105. The technology of the present disclosure allows the vehicle 105 to leverage the increased ability of the user device 115 for an emergency call when the vehicle is unable to utilize its communication unit 325.

Figure 7:
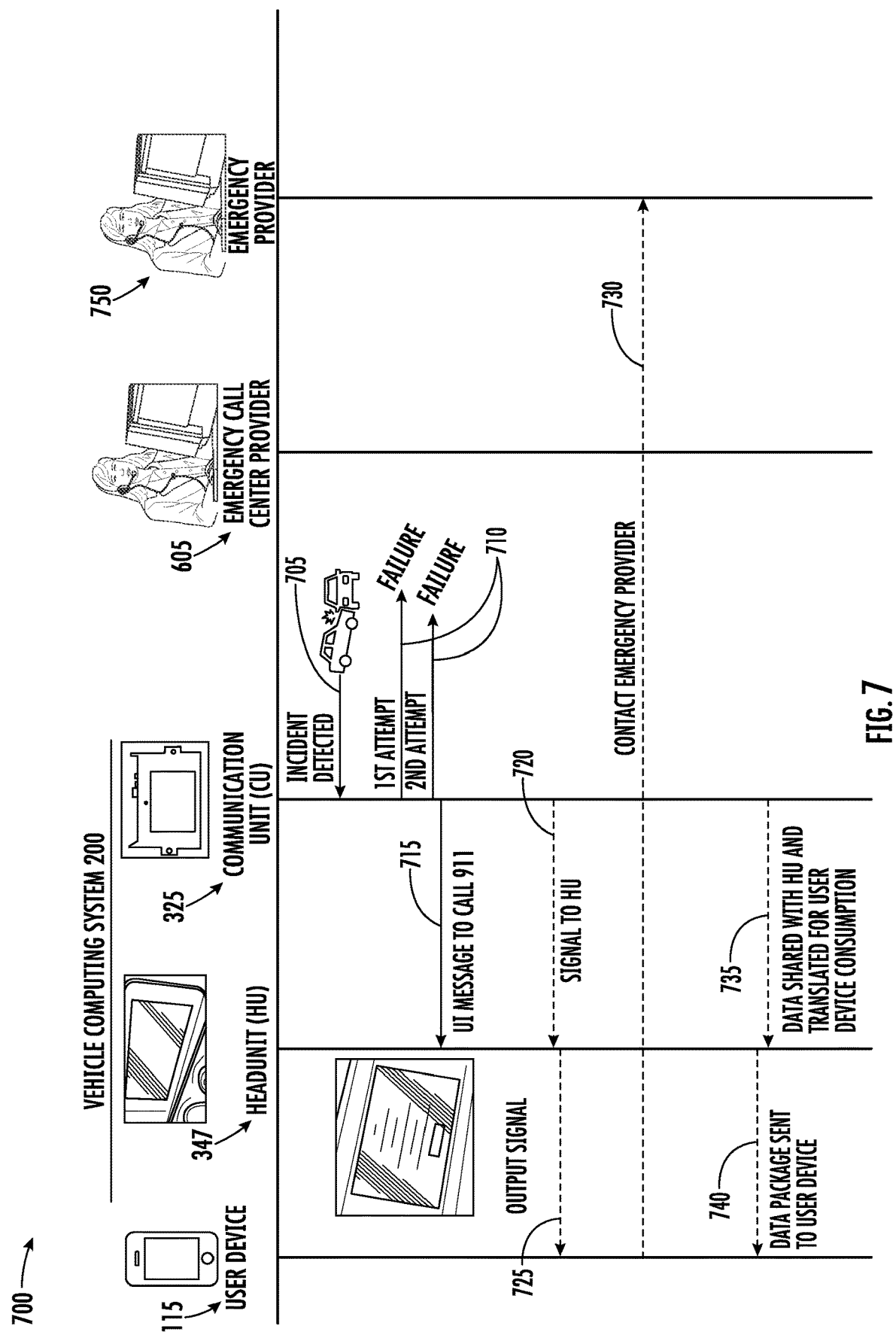
FIG. 7 illustrates a flowchart diagram of an example process for contacting an emergency provider according to an embodiment hereof.

FIG. 7 illustrates a flowchart diagram of an example process 700 for contacting an emergency provider 750 according to an embodiment hereof. The emergency provider 750 may be a medical responder, police department, fire department, other emergency response provider, or an operator (e.g., 911 call operator) associated therewith. The emergency provider 750 may be associated with the emergency provider system 610.

At (705), the vehicle computing system 200 may obtain, via one or more sensors, incident data 365 descriptive of an incident event involving the vehicle 105. The one or more sensors may include at least one of: (i) an impact crash sensor, (ii) a seat belt sensor, (iii) an accelerometer, (iv) a gyroscope, or (v) a yaw rate sensor. The sensors may be associated with sensor systems 305. The sensor systems 305 may process data collected via the sensors. The incident data 365 may include processed or raw data from the sensors.

The incident event may include, for example, a collision involving the vehicle 105 or the vehicle 105 rolling over. Based on the incident data 365, the vehicle computing system 200 may determine that an emergency provider is to be contacted. For example, incident data 365 may include sensor data associated with an airbag system (e.g., indicating a state of an airbag) or data associated with an inertial measurement unit configured to capture changes in orientation (e.g., yaw, pitch, roll), acceleration, etc. of the vehicle 105. Additionally, or alternatively, the incident data 365 may include data indicative of the state of a vehicle component (e.g., intact, broken, viable, functional).

The vehicle computing system 200 may process the incident data 365, which may indicate that the vehicle 105 collided with another object (e.g., another vehicle) and that the vehicle's airbags were deployed based on the sensor data associated with the airbags. Additionally, or alternatively, the vehicle computing system 200 may process the incident data 365 and determine that the vehicle 105 experienced a roll over.

The vehicle computing system 200 may determine that an emergency provider 610 (e.g., 911) should be contacted under these circumstances. For instance, the vehicle computing system 200 may determine, based on the incident data, that an emergency provider 750 is to be contacted. For instance, the vehicle computing system 200 may process the incident data 365 to determine a type of incident event or a severity of an incident event.

In an example, the vehicle computing system 200 may perform a look-up function to access a data structure (e.g., look-up table) to indicate whether an emergency provider 750 is to be contacted based on the type or severity of the incident event. The data structure may include a data field indicating whether or not an emergency provider is to be contacted given the type or severity of the incident event. For instance, in the event the vehicle 105 experiences a roll over, the data structure accessed by the vehicle computing system 200 may indicate that an emergency provider 750 is to be contacted.

In some implementations, the vehicle computing system 200 may utilize a model to determine an emergency provider 750 is to be contacted. For instance, the vehicle computing system 200 may process the incident data 365 using a machine-learned model trained to determine whether an incident event occurred or whether an emergency provider 610 is to be contacted based on the type of incident event or severity. The machine-learned model may include, for example, a neural network trained using training data with labels indicated types of incident events, severities, whether an emergency provider should be contacted, etc.

At (710), the vehicle computing system 200 may attempt to contact the emergency provider using the telecommunications resources onboard the vehicle 105. For instance, the communications unit 325 may be utilized to attempt to connect with the emergency provider 750 by placing a call to the emergency provider 610 using the telecommunications resources of the communications unit 325 (e.g., via the emergency call provider 605). In the event that a first call fails, the communications unit 325 may re-try and attempt a second call to the emergency provider 610. In the event the second call fails, the communications unit 325 may re-try and attempt one or more other calls to the emergency provider 750.

The vehicle computing system 200 may determine that that the vehicle 105 is unable to connect with the emergency provider 750 using a communication unit 325 of the vehicle 105. For instance, the vehicle computing system 200 may store (e.g., in an onboard memory) a call threshold indicating the number of attempted calls that vehicle 105 is to attempt to make via the communications unit 325 before determining that the vehicle 105 is unable to connect with the emergency provider 750. The threshold can include two attempts, three attempts, or so on. In some implementations, the threshold number of attempts may be set as a default. In some implementations, the threshold number of attempts may be dynamic based on the type or severity of the incident event.

By way of example, the vehicle computing system 200 may determine that the vehicle 105 has made a plurality of attempts (e.g., two attempts) to connect with the emergency provider 750 using the communication unit 325. Each attempt failed to establish a communications connection with a system associated with the emergency provider 750. The vehicle computing system 200 may determine that the plurality of attempts is equal to, or exceeds, a threshold number of attempts (e.g., two). In response to the plurality of attempts being equal to, or exceeding, the threshold number of attempts, the vehicle computing system 200 may determine that the vehicle 105 is unable to connect with the emergency provider 750 using the communications unit 325 of the vehicle 105 (e.g., via the emergency call center provider 605).

In response to determining the vehicle 105 is unable to connect with the emergency provider 750, the vehicle computing system 200 may seek to leverage a connected user device 115 to contact the emergency provider 750.

At (715), the vehicle computing system 200 may direct a user 120 to contact the emergency provider 750. For example, the communications unit 325 may output one or more signals to the head unit 347 initiate a display of content for a user 120 via a user interface of a display device 345 within the vehicle 105. The content may include a message instructing the user 120 to contact the emergency provider 750. The head unit 327 may include the display device 347 and may present the message to the user 120 via the user interface of the display device 347.

Additionally, or alternatively, at (720), a signal may be transmitted to the head unit 347 from the communications unit 325. The signal may be a CAN signal indicating that there has been a state change of the communications unit 325. The state change may indicate that the communications unit 325 is unable to connect with the emergency provider 750. In some implementations, the signal to the head unit 347 may indicate that the number of threshold calls have been attempted or failed. Additionally, or alternatively, the signal may indicate that the head unit 347 is to utilize, communicate with, etc. a user device 115 to contact the emergency provider 610. The user device 115 may be a mobile user device paired to the vehicle 105 (e.g., the head unit 325) through a short-range wireless protocol (e.g., Bluetooth® protocol).

At (725), the vehicle computing system 200 may output, to the user device 115 paired to the vehicle 105 through the short-range wireless protocol, a signal indicating that the user device 115 is to initiate a call to the emergency provider 750. For instance, the vehicle computing system 200 may transmit, via the head unit 347 of the vehicle 105, the signal indicating that the user device 115 is to initiate the call to the emergency provider 750. The signal may include a script to activate the user device 115 to trigger to the user deice 115 to call the emergency provider 750. At (730), the user device 115 may receive the signal from the head unit 347 and activate the script to initiate a call to the emergency provider 750 via a cell tower of the plurality of cell towers 615 available to the user device 115.

The user device 115 may establish a communications connection with the emergency vehicle provider system 610 associated with the emergency provider 750. The call between the user device 115 and the emergency provider 610 may utilize one or more audio components of the vehicle 105. In an example, an audio output device of the vehicle 105 (e.g., a speaker) may be utilized for an audio output portion of the call between the user device 115 and the emergency provider 750. The audio output portion of the call may be an audible voice of an operator associated with the emergency provider 750. Additionally, or alternatively, an audio input device (e.g., microphone) of the vehicle 105 may be utilized for an audio input portion of the call between the user device 115 and the emergency provider 750. The audio input portion of the call may include a voice input of the user 120 in the vehicle 105.

In some implementations, the call between the user device 115 and the emergency provider 750 may utilize a combination of input/output devices of the vehicle 105 and the user device 115. In an example, the audio output portion of the call between the user device 115 and the emergency provider 750 may be provided via an audio output device of the vehicle 105, while an audio input portion of the call between the user device and the emergency provider 750 may be provided via an audio input device of the user device 115 (e.g., a microphone of the phone). In another example, the audio output portion of the call between the user device 115 and the emergency provider 750 may be provided via an audio output device of the user device 115, while an audio input portion of the call between the user device 115 and the emergency provider 750 may be provided via an audio input device of the vehicle 105 (e.g., a microphone of the vehicle 105).

In some implementations, the input/output devices utilized for the call between the user device 115 and the emergency provider 750 may be selected based on a state of the input/output devices. By way of example, the vehicle computing system 200 may determine that an audio output device of the vehicle 102 has experienced a failure due to damage during a collision. The signal to the user device 115 (e.g., including the script from the head unit 347) may indicate that the user device 115 is to utilize an audio output device of the user device 115 for the call between the user device 115 and the emergency provider 750. A similar approach can be utilized for an audio input device of the vehicle 105 that experiences a failure.

In some implementations, the signal provided to the user device 115 can include information associated with the incident event. The head unit 347 of the vehicle 105 may be configured to generate a consumable data package for the user device 115 based on the incident data 365. The consumable data package may be formatted in a manner that may be processed by the user device 115 or a software application 510 running on the user device 120. The consumable data package for the user device 115 may include information associated with the incident event. The information associated with the incident event may include data indicative of at least one of: (i) a number of occupants, (ii) a heading of the vehicle 105, (iii) a location of the vehicle 105. (iv) a type of incident event, (v) a severity of the incident event, (vi) a position of an occupant in the vehicle 105, (vii) damage to vehicle, or other information associated with the incident event.

The signal provided to the user device 115 may include the consumable data package for the user device 115. For instance, the signal may be encoded with the consumable data package and a script instructing the user device 115 to provide at least a portion of the information associated with the incident event to the emergency provider system 650. Such information may be utilized by the emergency provider 750 to provide an emergency response for the vehicle 105.

In some implementations, the user device 115 may be configured to confirm the occurrence of an incident event. For example, the user device 115 may be configured to obtain sensor data (e.g., IMU data) from a sensor (e.g., an accelerometer, inertial sensor) of the user device 115. The sensor data may indicate a sudden change in orientation, acceleration, velocity, etc. of the user 120 or the vehicle 105. The user device 115 may process such data using the software application 510 to determine that the vehicle 105 was included in an incident event.

Additionally, or alternatively, the user device 115 may communicate with another user device of the user 120 (e.g., a wearable device) to obtain biometric data that may help confirm the occurrence of an incident event. By way of example, the user device 115 may obtain data indicative of a heart rate from a smart watch worn by the user 120. The user's heart rate may have suddenly increased, helping to confirm the likelihood of the vehicle 105 being involved in a incident event.

In some implementations, the user device 115 may obtain data from the vehicle 105 prior to the incident event. By way of example, by being paired with the vehicle 105, the user device 115 may obtain periodically, as scheduled, continuously, etc. vehicle data from the vehicle 105. The vehicle data 105 may indicate: (i) a speed/velocity of the vehicle 105; (ii) health/state of a vehicle component; (iii) a number of occupants, (iv) an orientation of the vehicle 105, or other information. Such data may be obtained and processed via the software application 510 of the user device 115 to generate a user interface presenting content indicative of the vehicle data. Such information may be provided to an emergency provider system 610 in response to the occurrence of an incident event.

In an embodiment, the software application 510 may process the data to determine the occurrence of an incident event. For instance, the software application 510 may process the orientation data to determine the vehicle 105 has experienced a roll over. In another example, the software application 510 may detect the occurrence of an incident event based on a sudden cease in communications being provided to the user device 115 from the vehicle 105. The software application 510 may determine that the cease in the communications, in combination with a sudden change in orientation, may indicate that the vehicle 105 has been involved in an incident event that has damaged the ability for the vehicle 105 to communicate data to the user device 115. As such, the user device 115 may call an emergency provider 750, as described herein.

Figure 8:
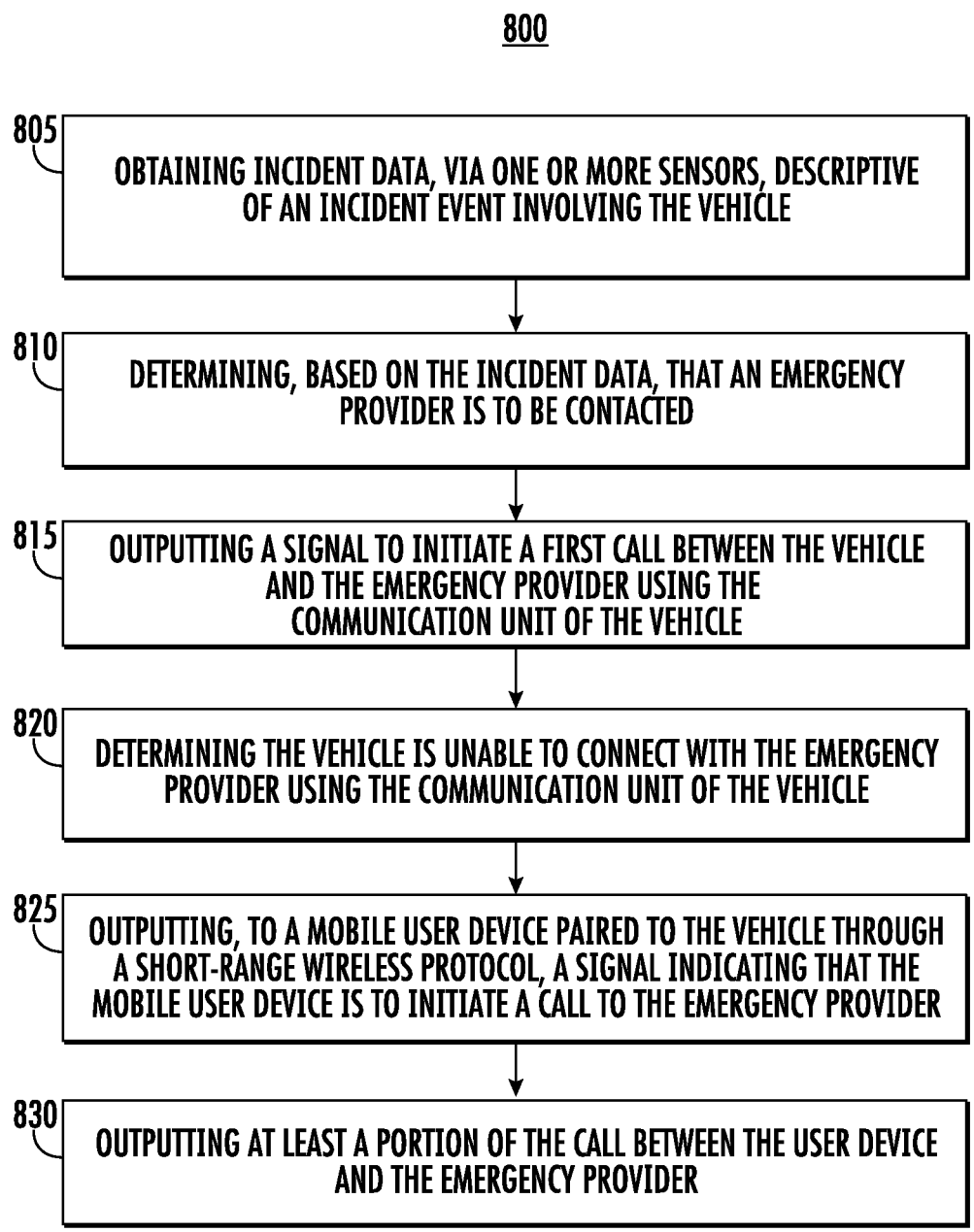
FIG. 8 illustrates a flowchart diagram of an example method according to an embodiment hereof.

FIG. 8 illustrates a flowchart diagram of an example method 800 for connecting with an emergency provider according to an embodiment hereof. The method 800 may be performed by a computing system described with reference to the other figures. In an embodiment, the method 800 may be performed by the control circuit of a vehicle computing system 200 of FIG. 1. One or more portions of the method 800 may be implemented as an algorithm on the hardware components of the devices described herein (e.g., as in FIGS. 1-7 and 9, etc.). For example, the steps of method 800 may be implemented as operations/instructions that are executable by computing hardware.

FIG. 8 illustrates elements performed in a particular order for purposes of illustration and discussion. Those of ordinary skill in the art, using the disclosures provided herein, will understand that the elements of any of the methods discussed herein may be adapted, rearranged, expanded, omitted, combined, or modified in various ways without deviating from the scope of the present disclosure. FIG. 8 is described with reference to elements/terms described with respect to other systems and figures for example illustrated purposes and is not meant to be limiting. One or more portions of method 800 may be performed additionally, or alternatively, by other systems. For example, method 800 may be performed by a control circuit of the computing platform 110.

In an embodiment, the method 800 may begin with or otherwise include an operation 805, in which the vehicle computing system 200 obtains, via one or more sensors, incident data 365 descriptive of an incident event involving the vehicle 105. The one or more sensors may include, for example, an impact sensor or an accelerometer. The incident data 365 may be indicative of an impact between a tree and a front portion of the vehicle 105 or indicative of a sudden change in acceleration. In some examples, the incident data 365 may be indicative of a type of incident event (e.g., the collision with the tree) and a severity (e.g., based on the damage to the vehicle 105).

The method 800 in an embodiment may include an operation 810, in which the computing system 200 may determine, based on the incident data, that an emergency provider is to be contacted. For instance, the vehicle computing system 200 may process the incident data 365 to determine the occurrence, type, or severity of the incident event. In some implementations, the vehicle computing system 200 may read the incident data 365 to identify the type or severity of the incident event. The vehicle computing system 200 may computationally determine whether an emergency provider is to be contacted given the incident event. For example, the vehicle computing system 200 may determine that the emergency provider is to be contact based on the occurrence of the tree collision, the severity of the damage caused to the vehicle 105, etc.

The method 800 in an embodiment may include an operation 815, in which the computing system 200 may output a signal to initiate a first call between the vehicle 105 and the emergency provider 750 using the communications unit 325 of the vehicle 105. For instance, the vehicle computing system 200 may output one or more control signals to initiate a plurality of attempts to establish, using the communication unit 325, a communications connection between the vehicle 500 and a system associated with the emergency provider (e.g., emergency provider system 610) until a threshold number of attempts is reached.

The vehicle 105 may attempt a first call the emergency provider 750 via the communications unit 315. The vehicle computing system 200 may determine that the first attempted call failed based on the inability of the vehicle 105 to establish a connection to the emergency provider system 610.

In response to the first failed call attempt, the computing system 200 may output a signal to initiate a second call between the vehicle 105 and the emergency provider 750 using the communications unit 325 of the vehicle 105. The vehicle 105 may attempt the second call to the emergency provider 750 via the communications unit 315. The vehicle computing system 200 may determine that the second attempted call failed based on the inability of the vehicle 105 to establish a connection to the emergency provider system 610. In some implementations, the vehicle computing system 200 may initiate one or more additional call attempts.

The method 800 in an embodiment may include an operation 820, in which the computing system 200 may determine that the vehicle 105 is unable to connect with the emergency provider 750 using a communication unit 325 of the vehicle 105. For instance, in the event the threshold number of attempts is reached (or exceeded), the vehicle computing system 200 may determine that the vehicle 105 is unable to connect with the emergency provider 750 using the telecommunications resources of the vehicle 105. In some examples, the threshold may be two call attempts.

The method 800 in an embodiment may include an operation 825, in which the computing system 200 may output, to a mobile user device 115 paired to the vehicle 105 through a short-range wireless protocol, a signal indicating that the mobile user device 115 is to initiate a call to the emergency provider 750. This may include, for example, transmitting, via a head unit 347 of the vehicle 105, a signal indicating that the mobile user device 115 is to initiate the call to the emergency provider 750.

In an example, the signal may include a consumable data package for the mobile user device 115. The signal may include information associated with the incident event. Such information may include incident data 365, location data, data indicative of a number of passengers, biometric data, etc. The mobile user device 115 may be configured to transmit at least a portion of the information associated with the incident event to the emergency provider 750 (e.g., the emergency provider system 610 associated therewith).

In some implementations, the mobile user device 115 may be configured to send other information to an emergency provider system 610. For example, as described herein, the mobile user device 115 may include a downloaded software application 510 associated with the vehicle 105. The mobile user device 115, via the software application 510, may obtain vehicle data associated with the vehicle 105 prior to the incident event. Such data may be periodically provided to the mobile user device 115 after pairing with the vehicle 105. The vehicle data may include seat belt data (e.g., indicative of engaged seat belts), window position data (e.g., up, down), location data leading up to the incident event, noise data (e.g., recordings lead up to the incident event), or other information. The mobile user device 115 may be configured to transmit at least a portion of the vehicle data to a system associated with the emergency provider (e.g., emergency provider system 610).

The method 800 in an embodiment may include an operation 830, in which the computing system 200 may facilitate the output of at least a portion of the call between the mobile user device 115 and the emergency provider 750. For instance, the pairing of the mobile user device 115 to the vehicle 105 may permit an audio output to be communicated through an audio output device of the vehicle 105 (e.g., a car speaker), in addition to, or rather, than an audio output device of the mobile user device (e.g., a phone speaker). Additionally, or alternatively, the pairing of the mobile user device 115 to the vehicle 105 may permit an audio input to be provided by the user 120 through an audio input device of the vehicle 105 (e.g., car microphone), rather than that of the mobile user device 115 (e.g., phone microphone). For the call between the mobile user deice 115, at least one of the following my occur: (i) an audio output device of the vehicle 105 is utilized for an audio output portion of the call between the mobile user device 115 and the emergency provider 750, or (ii) an audio input device of the vehicle 105 is utilized for an audible input portion of the call between the mobile user device to the emergency provider.

Figure 9:
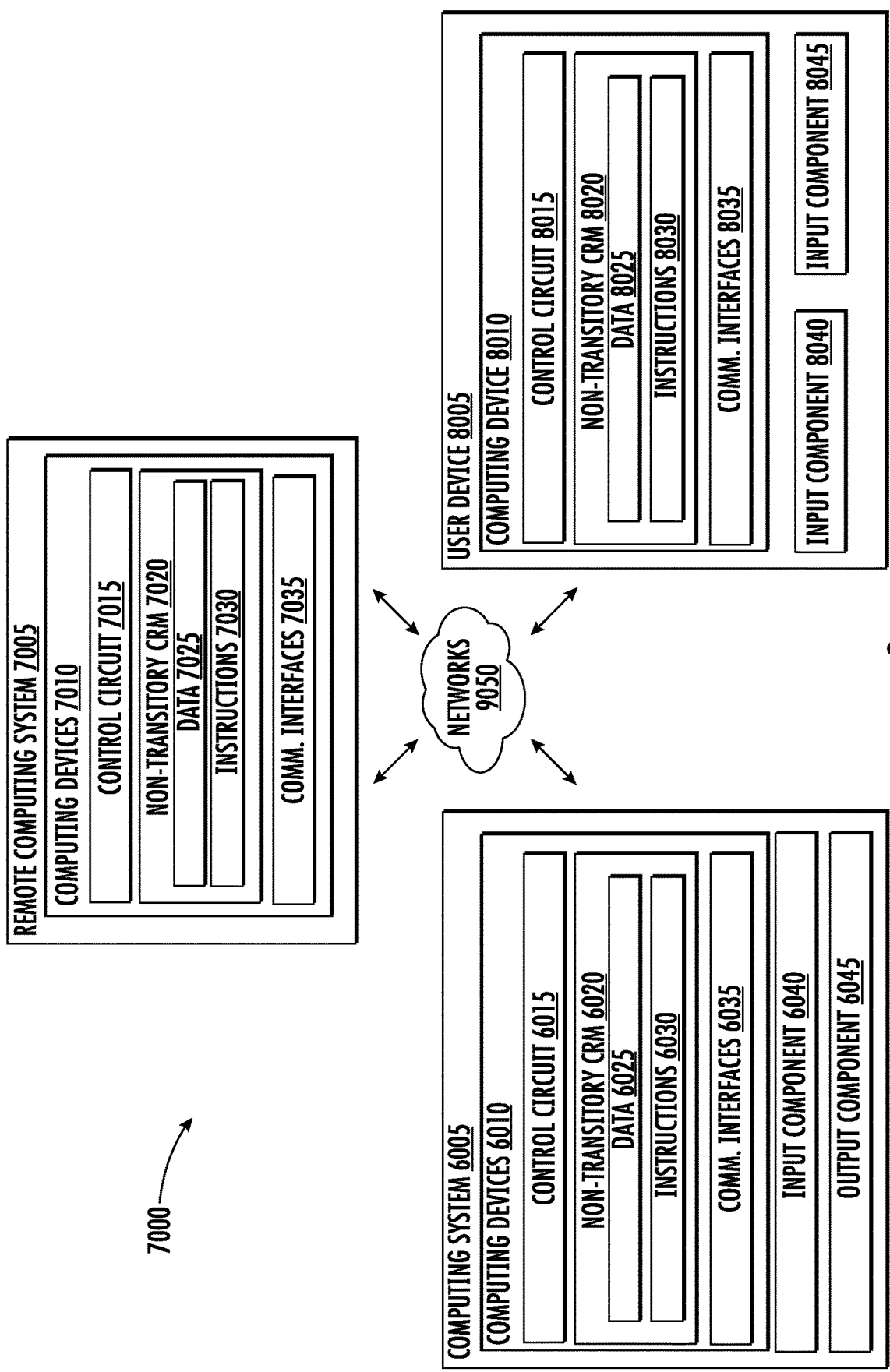
FIG. 9 illustrates a diagram of an example computing ecosystem with computing components according to an embodiment hereof.

FIG. 9 illustrates a block diagram of an example computing system 7000 according to an embodiment hereof. The system 7000 includes a computing system 6005 (e.g., a computing system onboard a vehicle), a remote computing system 7005 (e.g., a server computing system, a cloud computing platform, etc. that is remote from the vehicle), and a user device 8005 (e.g., user device of a vehicle user) that are communicatively coupled over one or more networks 9050. The computing system 6005, remote computing system 7005, user device 8005, and networks 9050 may represent the systems (and the components of those systems) and networks described herein with reference to other figures.

The computing system 6005 may include one or more computing devices 6010 or circuitry. For instance, the computing system 6005 may include a control circuit 6015 and a non-transitory computer-readable medium 6020, also referred to herein as memory. In an embodiment, the control circuit 6015 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In some implementations, the control circuit 6015 may be part of, or may form, a vehicle control unit (also referred to as a vehicle controller) that is embedded or otherwise disposed in a vehicle (e.g., a Mercedes-Benz® car or van). For example, the vehicle controller may be or may include an infotainment system controller (e.g., an infotainment head-unit), a telematics control unit (TCU), an electronic control unit (ECU), a central powertrain controller (CPC), a charging controller, a central exterior & interior controller (CEIC), a zone controller, or any other controller. In an embodiment, the control circuit 6015 may be programmed by one or more computer-readable or computer-executable instructions stored on the non-transitory computer-readable medium 6020.

In an embodiment, the non-transitory computer-readable medium 6020 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium 6020 may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 6020 may store information that may be accessed by the control circuit 6015. For instance, the non-transitory computer-readable medium 6020 (e.g., memory devices) may store data 6025 that may be obtained, received, accessed, written, manipulated, created, and/or stored. The data 6025 may include, for instance, any of the data or information described herein. In some implementations, the computing system 6005 may obtain data from one or more memories that are remote from the computing system 6005.

The non-transitory computer-readable medium 6020 may also store computer-readable instructions 6030 that may be executed by the control circuit 6015. The instructions 6030 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 6015 to perform one or more functional tasks. The modules and computer-readable/executable instructions may be described as performing various operations or tasks when the control circuit 6015 or other hardware component is executing the modules or computer-readable instructions.

The instructions 6030 may be executed in logically and/or virtually separate threads on the control circuit 6015. For example, the non-transitory computer-readable medium 6020 may store instructions 6030 that when executed by the control circuit 6015 cause the control circuit 6015 to perform any of the operations, methods and/or processes described herein. In some cases, the non-transitory computer-readable medium 620 may store computer-executable instructions or computer-readable instructions, such as instructions to perform at least a portion of the method of FIG. 8.

The computing system 6005 may include one or more communication interfaces 6035. The communication interfaces 6035 may be used to communicate with one or more other systems. The communication interfaces 6035 may include any circuits, components, software, etc. for communicating via one or more networks (e.g., networks 750). In some implementations, the communication interfaces 6035 may include for example, one or more of a communications controller, receiver, transceiver, transmitter, port, conductors, software and/or hardware for communicating data/information.

The computing system 6005 may also include one or more user input components 6040 that receives user input. For example, the user input component 6040 may be a touch-sensitive component (e.g., a touch-sensitive display screen or a touch pad) that is sensitive to the touch of a user input object (e.g., a finger or a stylus). The touch-sensitive component may serve to implement a virtual keyboard. Other example user input components include a microphone, a traditional keyboard, cursor-device, joystick, or other devices by which a user may provide user input.

The computing system 6005 may include one or more output components 6045. The output components 6045 may include hardware and/or software for audibly or visually producing content. For instance, the output components 6045 may include one or more speakers, earpieces, headsets, handsets, etc. The output components 6045 may include a display device, which may include hardware for displaying a user interface and/or messages for a user. By way of example, the output component 6045 may include a display screen, CRT, LCD, plasma screen, touch screen, TV, projector, tablet, and/or other suitable display components.

The remote computing system 7005 may include one or more computing devices 710. In an embodiment, the remote computing system 7005 may include or is otherwise implemented by one or more server computing devices. In instances in which the remote computing system 7005 includes plural server computing devices, such server computing devices may operate according to sequential computing architectures, parallel computing architectures, or some combination thereof.

The remote computing system 7005 may include a control circuit 7015 and a non-transitory computer-readable medium 7020, also referred to herein as memory 7020. In an embodiment, the control circuit 7015 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 7015 may be programmed by one or more computer-readable or computer-executable instructions stored on the non-transitory computer-readable medium 7020.

In an embodiment, the non-transitory computer-readable medium 7020 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), or a digital versatile disk (DVD), and/or a memory stick.

The non-transitory computer-readable medium 7020 may store information that may be accessed by the control circuit 7015. For instance, the non-transitory computer-readable medium 7020 (e.g., memory devices) may store data 7025 that may be obtained, received, accessed, written, manipulated, created, and/or stored. The data 7025 may include, for instance, any of the data or information described herein. In some implementations, the remote computing system 7005 may obtain data from one or more memories that are remote from the remote computing system 7005.

The non-transitory computer-readable medium 7020 may also store computer-readable instructions 7030 that may be executed by the control circuit 7015. The instructions 7030 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 7015 to perform one or more functional tasks. The modules and computer-readable/executable instructions may be described as performing various operations or tasks when the control circuit 7015 or other hardware component is executing the modules or computer-readable instructions.

The instructions 7030 may be executed in logically and/or virtually separate threads on the control circuit 7015. For example, the non-transitory computer-readable medium 7020 may store instructions 7030 that when executed by the control circuit 7015 cause the control circuit 7015 to perform any of the operations, methods and/or processes described herein. In some cases, the non-transitory computer-readable medium 7020 may store computer-executable instructions or computer-readable instructions, such as instructions to perform at least a portion of the method of FIG. 8.

The server computing system 7005 may include one or more communication interfaces 7035. The communication interfaces 7035 may be used to communicate with one or more other systems. The communication interfaces 7035 may include any circuits, components, software, etc. for communicating via one or more networks (e.g., networks 9050). In some implementations, the communication interfaces 7035 may include for example, one or more of a communications controller, receiver, transceiver, transmitter, port, conductors, software and/or hardware for communicating data/information.

The computing system 6005 and/or the server computing system 7005 may also be in communication with a user device 8005 that is communicatively coupled over the networks 9050.

The user device 8005 may include one or more computing devices 8010. The user device 8005 may include a control circuit 8015 and a non-transitory computer-readable medium 8020, also referred to herein as memory 8020. In an embodiment, the control circuit 8015 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 8015 may be programmed by one or more computer-readable or computer-executable instructions stored on the non-transitory computer-readable medium 8020.

In an embodiment, the non-transitory computer-readable medium 8020 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 8020 may store information that may be accessed by the control circuit 8015. For instance, the non-transitory computer-readable medium 820 (e.g., memory devices) may store data 8025 that may be obtained, received, accessed, written, manipulated, created, and/or stored. The data 8025 may include, for instance, any of the data or information described herein. In some implementations, the user device 8005 may obtain data from one or more memories that are remote from the user device 8005.

The non-transitory computer-readable medium 8020 may also store computer-readable instructions 8030 that may be executed by the control circuit 8015. The instructions 8030 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 8015 to perform one or more functional tasks. The modules and computer-readable/executable instructions may be described as performing various operations or tasks when the control circuit 8015 or other hardware component is executing the modules or computer-readable instructions.

The instructions 8030 may be executed in logically or virtually separate threads on the control circuit 8015. For example, the non-transitory computer-readable medium 8020 may store instructions 8030 that when executed by the control circuit 8015 cause the control circuit 8015 to perform any of the operations, methods and/or processes described herein. In some cases, the non-transitory computer-readable medium 8020 may store computer-executable instructions or computer-readable instructions, such as instructions to perform at least a portion of the method of FIG. 8.

The user device 8005 may include one or more communication interfaces 8035. The communication interfaces 8035 may be used to communicate with one or more other systems. The communication interfaces 8035 may include any circuits, components, software, etc. for communicating via one or more networks (e.g., networks 9050). In some implementations, the communication interfaces 8035 may include for example, one or more of a communications controller, receiver, transceiver, transmitter, port, conductors, software and/or hardware for communicating data/information.

The user device 8005 may also include one or more user input components 840 that receives user input. For example, the user input component 8040 may be a touch-sensitive component (e.g., a touch-sensitive display screen or a touch pad) that is sensitive to the touch of a user input object (e.g., a finger or a stylus). The touch-sensitive component may serve to implement a virtual keyboard. Other example user input components include a microphone, a traditional keyboard, cursor-device, joystick, or other devices by which a user may provide user input.

The user device 8005 may include one or more output components 8045. The output components 8045 may include hardware and/or software for audibly or visually producing content. For instance, the output components 8045 may include one or more speakers, earpieces, headsets, handsets, etc. The output components 8045 may include a display device, which may include hardware for displaying a user interface and/or messages for a user. By way of example, the output component 8045 may include a display screen, CRT, LCD, plasma screen, touch screen, TV, projector, tablet, and/or other suitable display components.

The one or more networks 9050 may be any type of communications network, such as a local area network (e.g., intranet), wide area network (e.g., Internet), or some combination thereof and may include any number of wired or wireless links. In general, communication over a network 9050 may be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Additional Discussion of Various Embodiments

Embodiment 1 relates to a computing system of a vehicle. In this embodiment, the computing system includes a control circuit configured to obtain incident data, via one or more sensors, descriptive of an incident event involving the vehicle. The control circuit is configured to determine, based on the incident data, that an emergency provider is to be contacted. The control circuit is configured to determine that the vehicle is unable to connect with the emergency provider using a communication unit of the vehicle. The control circuit is configured to output, to a mobile user device paired to the vehicle through a short-range wireless protocol, a signal indicating that the mobile user device is to initiate a call to the emergency provider.

Embodiment 2 includes the computing system of Embodiment 1. In this embodiment, to determine that the vehicle is unable to connect with the emergency provider using the communication unit of the vehicle, the control circuit is configured to determine that the vehicle has made a plurality of attempts to connect with the emergency provider using the communication unit, wherein each attempt failed to establish a communications connection with a system associated with the emergency provider; determine that the plurality of attempts is equal to, or exceeds, a threshold number of attempts; and in response to the plurality of attempts being equal to, or exceeding, the threshold number of attempts, determine that the vehicle is unable to connect with the emergency provider using the communication unit of the vehicle.

Embodiment 3 includes the computing system of any of Embodiments 1 or 2. In this embodiment, an audio output device of the vehicle is utilized for an audio output portion of the call between the mobile user device and the emergency provider.

Embodiment 4 includes the computing system of any of Embodiments 1-3. In this embodiment, an audio input device of the vehicle is utilized for an audible input portion of the call between the mobile user device and the emergency provider.

Embodiment 5 includes the computing system of any of Embodiments 1-4. In this embodiment, to output the signal indicating that the mobile user device is to initiate the call to the emergency provider, the control circuit is configured to: transmit, via a head unit of the vehicle, the signal indicating that the mobile user device is to initiate the call to the emergency provider.

Embodiment 6 includes the computing system of any of Embodiments 1-5. In this embodiment, the head unit of the vehicle is configured to generate a consumable data package for the mobile user device based on the incident data. The signal includes the consumable data package for the mobile user device.

Embodiment 7 includes the computing system of any of Embodiments 1-6. In this embodiment, the consumable data package for the mobile user device includes information associated with the incident event. The mobile user device is configured to communicate at least a portion of the information associated with the incident event to the emergency provider.

Embodiment 8 includes the computing system of any of Embodiments 1-7. In this embodiment, the information associated with the incident event includes data indicative at least one of: (i) a number of occupants, (ii) a heading of the vehicle, or (iii) a location of the vehicle.

Embodiment 9 includes the computing system of any of Embodiments 1-8. In this embodiment, the control circuit is further configured to: output one or more signals to initiate a display of content for a user via a user interface of a display device within the vehicle. The content includes a message instructing the user to contact the emergency provider.

Embodiment 10 includes the computing system of any of Embodiments 1-9. In this embodiment, the control circuit is further configured to determine that an audio output device of the vehicle has experienced a failure. The signal to the mobile user device indicates the mobile user device is to utilize an audio output device of the mobile user device for the call between the mobile user device and the emergency provider.

Embodiment 11 includes the computing system of any of Embodiments 1-10. In this embodiment, the one or more sensors include at least one of: (i) an impact crash sensor, (ii) a seat belt sensor, (iii) an accelerometer, (iv) a gyroscope, or (v) a yaw rate sensor.

Embodiment 12 relates to a computer-implemented method. In this embodiment, the computer-implemented method includes obtaining, via one or more sensors, incident data descriptive of an incident event involving the vehicle. The computer-implemented method includes determining, based on the incident data, that an emergency provider is to be contacted. The computer-implemented method includes determining that the vehicle is unable to connect with the emergency provider using a communication unit of the vehicle. The computer-implemented method includes outputting, to a mobile user device paired to the vehicle through a short-range wireless protocol, a signal indicating that the mobile user device is to initiate a call to the emergency provider.

Embodiment 13 includes the computer-implemented method of Embodiment 12. In this embodiment, the computer-implemented method includes outputting a signal to initiate a first call between the vehicle and the emergency provider using the communication unit of the vehicle.

Embodiment 14 includes the computer-implemented method of any of Embodiments 12 or 13. In this embodiment, determining that the vehicle is unable to connect with the emergency provider using the communication unit of the vehicle includes: determining that, for the first call, the vehicle has failed to establish a first connection with a system associated with the emergency provider using the communication unit of the vehicle; transmitting a control signal to initiate a second call between the vehicle and the emergency provider using the communication unit of the vehicle; and determining that, for the second call, the vehicle has failed to establish a second connection with the system associated with the emergency provider using the communication unit of the vehicle.

Embodiment 15 includes the computer-implemented method of any of Embodiments 12-14. In this embodiment, at least one of: (i) an audio output device of the vehicle is utilized for an audio output portion of the call between the mobile user device and the emergency provider, or (ii) an audio input device of the vehicle is utilized for an audible input portion of the call between the mobile user device to the emergency provider.

Embodiment 16 includes the computer-implemented method of any of Embodiments 12-15. In this embodiment, outputting the signal indicating that the mobile user device is to initiate the call to the emergency provider includes transmitting, via a head unit of the vehicle, the signal indicating that the mobile user device is to initiate the call to the emergency provider.

Embodiment 17 includes the computer-implemented method of any of Embodiments 12-16. In this embodiment, the signal indicating that the mobile user device is to initiate the call to the emergency provider includes information associated with the incident event. The mobile user device is configured to transmit at least a portion of the information associated with the incident event to the emergency provider.

Embodiment 18 includes the computer-implemented method of any of Embodiments 12-17. In this embodiment, the mobile user device includes a downloaded software application associated with the vehicle. The mobile user device, via the software application, obtains vehicle data associated with the vehicle prior to the incident event. The mobile user device is configured to transmit at least a portion of the vehicle data to a system associated with the emergency provider.

Embodiment 19 relates to one or more non-transitory computer-readable media that store instructions that are executable by a control circuit to: obtain, via one or more sensors, incident data descriptive of an incident event involving the vehicle; determine, based on the incident data, that an emergency provider is to be contacted; determine that the vehicle is unable to connect with the emergency provider using a communication unit of the vehicle; and output, to a mobile user device paired to the vehicle through a short-range wireless protocol, a signal indicating that the mobile user device is to initiate a call to the emergency provider.

Embodiment 20 includes the one or more non-transitory computer-readable media of Embodiment 19. In this embodiment, to determine that the vehicle is unable to connect with the emergency provider using the communication unit of the vehicle, the control circuit is configured to output one or more control signals to initiate a plurality of attempts to establish, using the communication unit, a communications connection between the vehicle and a system associated with the emergency provider until a threshold number of attempts is reached.

Additional Disclosure

As used herein, adjectives and their possessive forms are intended to be used interchangeably unless apparent otherwise from the context and/or expressly indicated. For instance, "component of a/the vehicle" may be used interchangeably with "vehicle component" where appropriate. Similarly, words, phrases, and other disclosure herein is intended to cover obvious variants and synonyms even if such variants and synonyms are not explicitly listed.

Computing tasks and operations discussed herein as being performed at or by computing device(s) remote from the vehicle can instead be performed at the vehicle (e.g., via the vehicle computing system), or vice versa.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein may be implemented using a single device or component or multiple devices or components working in combination. Databases and applications may be implemented on a single system or distributed across multiple systems. Distributed components may operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, may readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment may be used with another embodiment to yield a still further embodiment. Thus, it is intended that the present disclosure cover such alterations, variations, and equivalents.

Aspects of the disclosure have been described in terms of illustrative implementations thereof. Numerous other implementations, modifications, or variations within the scope and spirit of the appended claims may occur to persons of ordinary skill in the art from a review of this disclosure. Any and all features in the following claims may be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. The term "or" and "and/or" may be used interchangeably herein. Lists joined by a particular conjunction such as "or," for example, may refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein may be adapted, rearranged, expanded, omitted, combined, or modified in various ways without deviating from the scope of the present disclosure. At times, elements may be listed in the specification or claims using a letter reference for exemplary illustrated purposes and is not meant to be limiting. Letter references, if used, do not imply a particular order of operations or a particular importance of the listed elements. For instance, letter identifiers such as (a), (b), (c), . . . , (i), (ii), (iii), . . . , etc. may be used to illustrate operations or different elements in a list. Such identifiers are provided for the ease of the reader and do not denote a particular order, importance, or priority of steps, operations, or elements. For instance, an operation illustrated by a list identifier of (a), (i), etc. may be performed before, after, or in parallel with another operation illustrated by a list identifier of (b), (ii), etc.

What is claimed is:

1. A computing system of a vehicle comprising:
 a control circuit configured to:
  obtain incident data, via one or more sensors, descriptive of an incident event involving the vehicle;
  determine, based on the incident data, that an emergency provider is to be contacted;
  determine that the vehicle is unable to connect with the emergency provider using a communication unit of the vehicle, wherein the control circuit is configured to:
  determine that the vehicle has made a plurality of attempts to connect with the emergency provider using the communication unit, wherein each attempt failed to establish a communications connection with a system associated with the emergency provider;
  determine that the plurality of attempts is equal to, or exceeds, a threshold number of attempts; and
  in response to the plurality of attempts being equal to, or exceeding, the threshold number of attempts, determine that the vehicle is unable to connect with the emergency provider using the communication unit of the vehicle; and
  output, to a mobile user device paired to the vehicle through a short-range wireless protocol, a signal indicating that the mobile user device is to initiate a call to the emergency provider.

2. The computing system of claim 1, wherein an audio output device of the vehicle is utilized for an audio output portion of the call between the mobile user device and the emergency provider.

3. The computing system of claim 1, wherein an audio input device of the vehicle is utilized for an audible input portion of the call between the mobile user device and the emergency provider.

4. The computing system of claim 1, wherein to output the signal indicating that the mobile user device is to initiate the call to the emergency provider, the control circuit is configured to:
 transmit, via a head unit of the vehicle, the signal indicating that the mobile user device is to initiate the call to the emergency provider.

5. The computing system of claim 4, wherein the head unit of the vehicle is configured to generate a consumable data package for the mobile user device based on the incident data, and wherein the signal comprises the consumable data package for the mobile user device.

6. The computing system of claim 5, wherein the consumable data package for the mobile user device comprises information associated with the incident event, and wherein the mobile user device is configured to communicate at least a portion of the information associated with the incident event to the emergency provider.

7. The computing system of claim 6, wherein the information associated with the incident event comprises data indicative at least one of: (i) a number of occupants, (ii) a heading of the vehicle, or (iii) a location of the vehicle.

8. The computing system of claim 1, wherein the control circuit is further configured to:
 output one or more signals to initiate a display of content for a user via a user interface of a display device within the vehicle, the content comprising a message instructing the user to contact the emergency provider.

9. The computing system of claim 1, wherein the control circuit is further configured to:
 determine that an audio output device of the vehicle has experienced a failure, and
 wherein the signal to the mobile user device indicates the mobile user device is to utilize an audio output device of the mobile user device for the call between the mobile user device and the emergency provider.

10. The computing system of claim 1, wherein the one or more sensors comprise at least one of: (i) an impact crash sensor, (ii) a seat belt sensor, (iii) an accelerometer, (iv) a gyroscope, or (v) a yaw rate sensor.

11. A computer-implemented method comprising:
 obtaining, via one or more sensors, incident data descriptive of an incident event involving a vehicle;
 determining, based on the incident data, that an emergency provider is to be contacted;
 determining that the vehicle is unable to connect with the emergency provider using a communication unit of the vehicle, wherein the determining that the vehicle is unable to connect with the emergency provider further comprises:
 determining that, for a first call, the vehicle has failed to establish a first connection with a system associated with the emergency provider using the communication unit of the vehicle;

transmitting a control signal to initiate a second call between the vehicle and the emergency provider using the communication unit of the vehicle; and determining that, for the second call, the vehicle has failed to establish a second connection with the system associated with the emergency provider using the communication unit of the vehicle; and outputting, to a mobile user device paired to the vehicle through a short-range wireless protocol, a signal indicating that the mobile user device is to initiate a call to the emergency provider.

12. The computer-implemented method of claim 11, further comprising:

outputting a signal to initiate the first call between the vehicle and the emergency provider using the communication unit of the vehicle.

13. The computer-implemented method of claim 11, wherein at least one of: (i) an audio output device of the vehicle is utilized for an audio output portion of the call between the mobile user device and the emergency provider, or (ii) an audio input device of the vehicle is utilized for an audible input portion of the call between the mobile user device to the emergency provider.

14. The computer-implemented method of claim 11, wherein outputting the signal indicating that the mobile user device is to initiate the call to the emergency provider comprises:

transmitting, via a head unit of the vehicle, the signal indicating that the mobile user device is to initiate the call to the emergency provider.

15. The computer-implemented method of claim 11, wherein the signal indicating that the mobile user device is to initiate the call to the emergency provider comprises information associated with the incident event, and wherein the mobile user device is configured to transmit at least a portion of the information associated with the incident event to the emergency provider.

16. The computer-implemented method of claim 11, wherein the mobile user device comprises a downloaded software application associated with the vehicle, and wherein the mobile user device, via the software application, obtains vehicle data associated with the vehicle prior to the incident event, and wherein the mobile user device is configured to transmit at least a portion of the vehicle data to a system associated with the emergency provider.

17. One or more non-transitory computer-readable media that store instructions that are executable by a control circuit to:

obtain, via one or more sensors, incident data descriptive of an incident event involving a vehicle;

determine, based on the incident data, that an emergency provider is to be contacted;

determine that the vehicle is unable to connect with the emergency provider using a communication unit of the vehicle, wherein the control circuit is configured to output one or more control signals to initiate a plurality of attempts to establish, using the communication unit, a communications connection between the vehicle and a system associated with the emergency provider until a threshold number of attempts is reached; and output, to a mobile user device paired to the vehicle through a short-range wireless protocol, a signal indicating that the mobile user device is to initiate a call to the emergency provider.

18. The computing system of claim 5, wherein the consumable data package is encrypted.

\* \* \* \* \*